US011541888B2

(12) United States Patent
Mizuno et al.

(10) Patent No.: US 11,541,888 B2
(45) Date of Patent: Jan. 3, 2023

(54) DRIVING ASSIST DEVICE AND DRIVING ASSIST METHOD

(71) Applicant: DENSO CORPORATION, Kariya (JP)

(72) Inventors: Ryo Mizuno, Kariya (JP); Yohei Masui, Kariya (JP)

(73) Assignee: DENSO CORPORATION, Kariya (JP)

( * ) Notice: Subject to any disclaimer, the term of this patent is extended or adjusted under 35 U.S.C. 154(b) by 195 days.

(21) Appl. No.: 16/991,431

(22) Filed: Aug. 12, 2020

(65) Prior Publication Data

US 2020/0369274 A1 Nov. 26, 2020

Related U.S. Application Data

(63) Continuation of application No. PCT/JP2019/002398, filed on Jan. 25, 2019.

(30) Foreign Application Priority Data

Feb. 14, 2018 (JP) ............................ JP2018-024119

(51) Int. Cl.

*B60W 30/16* (2020.01)
*B60W 10/18* (2012.01)

(Continued)

(52) U.S. Cl.

CPC ........... *B60W 30/162* (2013.01); *B60W 10/18* (2013.01); *B60W 10/20* (2013.01); *B60W 30/09* (2013.01);

(Continued)

(58) Field of Classification Search

CPC ........... B60W 30/162; B60W 2552/00; B60W 10/18; B60W 10/20; B60W 30/09;

(Continued)

(56) References Cited

U.S. PATENT DOCUMENTS

2005/0225479 A1* 10/2005 Shirai ..................... G01S 13/93 342/52
2008/0300787 A1* 12/2008 Zeng ..................... G01S 13/931 701/301

(Continued)

FOREIGN PATENT DOCUMENTS

JP 2005-071204 A 3/2005
JP 2005-145396 A 6/2005
JP 2015-206797 A 11/2015

*Primary Examiner* — Yazan A Soofi
*Assistant Examiner* — Naeem Taslim Alam
(74) *Attorney, Agent, or Firm* — Maschoff Brennan

(57) ABSTRACT

A driving assist device includes a first sensor, a second sensor, and a control device. The control device does not execute an inter-vehicle distance control under a predetermined first condition upon determination that at least one preceding object is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device executes the inter-vehicle distance control under a predetermined second condition upon determination that the environment of the non-detection sensor satisfies a second requirement for determination of the reliability of the output of the non-detection sensor.

18 Claims, 10 Drawing Sheets

(51) Int. Cl.
*B60W 30/09* (2012.01)
*B60W 30/095* (2012.01)
*G08G 1/16* (2006.01)
*B60W 10/20* (2006.01)

(52) U.S. Cl.
CPC ..... *B60W 30/0956* (2013.01); *B60W 2420/42* (2013.01); *B60W 2420/52* (2013.01); *B60W 2552/00* (2020.02); *G08G 1/166* (2013.01)

(58) Field of Classification Search
CPC ......... B60W 30/0956; B60W 2420/42; B60W 2420/52; G08G 1/166
See application file for complete search history.

(56) References Cited

U.S. PATENT DOCUMENTS

| | | | | |
|---|---|---|---|---|
| 2009/0135065 | A1* | 5/2009 | Tsuchida | G01S 17/931<br>342/450 |
| 2011/0166746 | A1* | 7/2011 | Breuer | B60T 17/221<br>701/29.2 |
| 2014/0297171 | A1* | 10/2014 | Minemura | G08G 1/166<br>342/70 |
| 2015/0298692 | A1 | 10/2015 | Minemura et al. | |
| 2016/0375903 | A1 | 12/2016 | Minemura et al. | |
| 2017/0327118 | A1 | 11/2017 | Masui et al. | |
| 2019/0241194 | A1* | 8/2019 | Fukasawa | G08G 1/16 |
| 2019/0293787 | A1 | 9/2019 | Sakai et al. | |
| 2021/0070293 | A1* | 3/2021 | Arai | B60W 10/06 |

* cited by examiner 500
501
502
503
23
510
221
504
22
25
505
32
31
ICE
100
24
10
21
520
211

100
221,22
CAMERA
211,21
MILLIMETER WAVE
CAMERA RECOGNITION RESULTS
MILLIMETER WAVE RECOGNITION RESULTS
FSN
FSN OBJECT or MILLIMETER WAVE-ONLY OBJECT or CAMERA-ONLY OBJECT
SELECTION OF PRECEDING VEHICLE
P1
PRECEDING VEHICLE INFORMATION (DISTANCE, RELATIVE SPEED, etc.)
CALCULATION OF TARGET ACCELERATION
P2
TARGET ACCELERATION
ENG
31,ICE
BRAKE
32,503

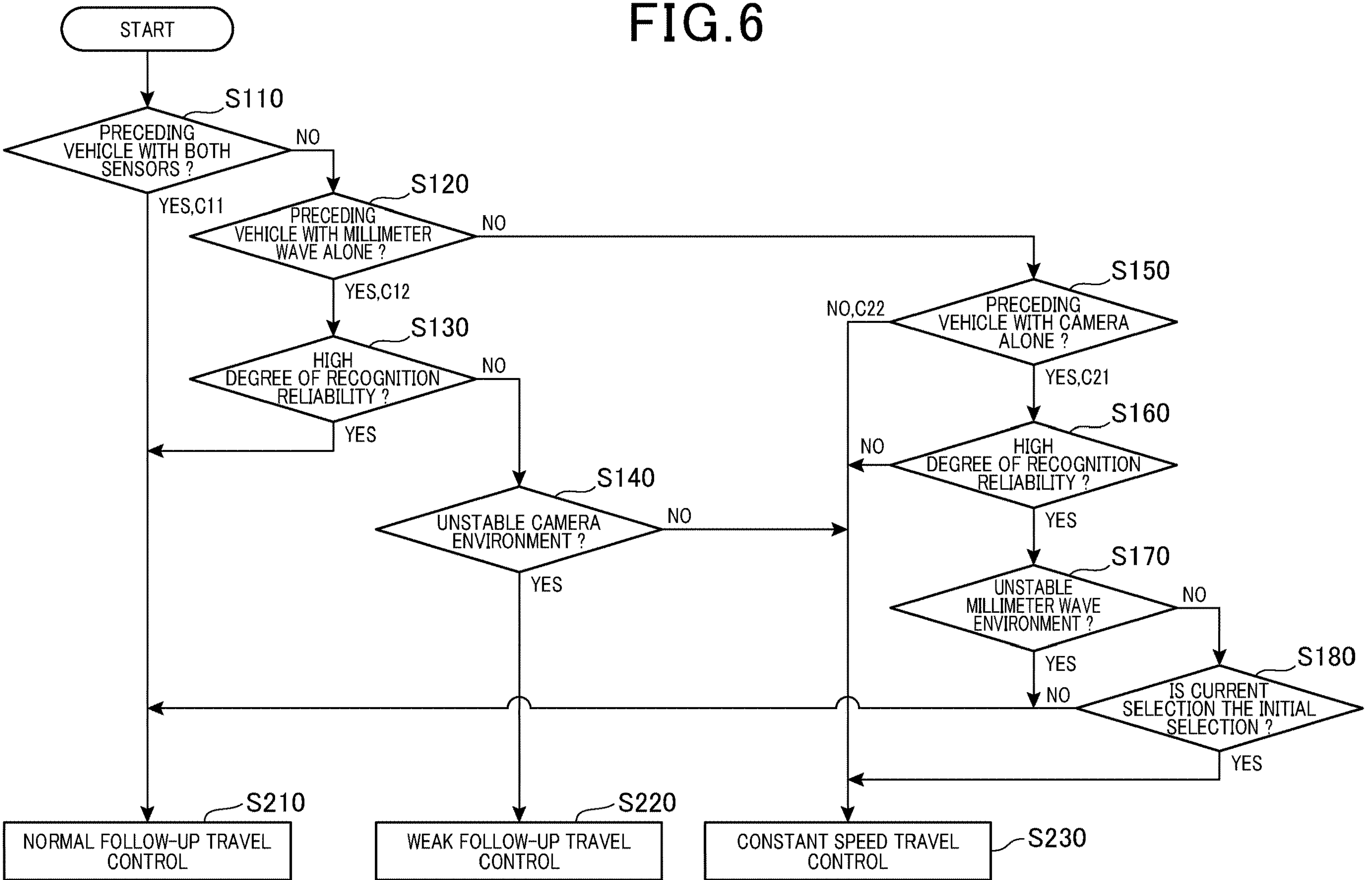
FIG.6
START
S110
PRECEDING VEHICLE WITH BOTH SENSORS ?
YES,C11
NO
S120
PRECEDING VEHICLE WITH MILLIMETER WAVE ALONE ?
YES,C12
NO
S130
HIGH DEGREE OF RECOGNITION RELIABILITY ?
YES
NO
S140
UNSTABLE CAMERA ENVIRONMENT ?
YES
NO
S150
PRECEDING VEHICLE WITH CAMERA ALONE ?
YES,C21
NO,C22
S160
HIGH DEGREE OF RECOGNITION RELIABILITY ?
YES
NO
S170
UNSTABLE MILLIMETER WAVE ENVIRONMENT ?
YES
NO
S180
IS CURRENT SELECTION THE INITIAL SELECTION ?
YES
NO
S210
NORMAL FOLLOW-UP TRAVEL CONTROL
S220
WEAK FOLLOW-UP TRAVEL CONTROL
S230
CONSTANT SPEED TRAVEL CONTROL

DRIVING ASSIST DEVICE AND DRIVING ASSIST METHOD

CROSS-REFERENCE TO RELATED APPLICATION

The present application is a continuation application of International Application No. PCT/JP2019/002398, filed on Jan. 25, 2019, which claims priority to Japanese Patent Application No. 2018-024119, filed on Feb. 14, 2018. The contents of these applications are incorporated herein by reference in their entirety.

BACKGROUND

Technical Field

The present disclosure relates to driving assist for a vehicle.

Background Art

Vehicle driving assist devices exist in the prior art which recognize three-dimensional objects external to a vehicle based on the output of a millimeter wave radar serving as a sensor and on the output of a camera.

SUMMARY

In the present disclosure, provided is a driving assist device as the following. The driving assist device including a first sensor, a second sensor, and a control device. The control device is configured not to execute an inter-vehicle distance control under a predetermined first condition upon determination that at least one preceding object is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device is configured to execute the inter-vehicle distance control under a predetermined second condition upon determination that the environment of the non-detection sensor satisfies a second requirement for determination of the reliability of the output of the non-detection sensor, each of the first and second conditions representing that a corresponding level of the reliability of the output of the non-detection sensor, the level of the reliability of the output of the non-detection sensor represented by the second condition being lower than the level of the reliability of the output of the non-detection sensor represented by the first condition.

BRIEF DESCRIPTION OF THE DRAWINGS

FIG. 6 is a flowchart showing a process of determining the contents of the inter-vehicle distance control.

DETAILED DESCRIPTION OF THE PREFERRED EMBODIMENTS

Figure 1:
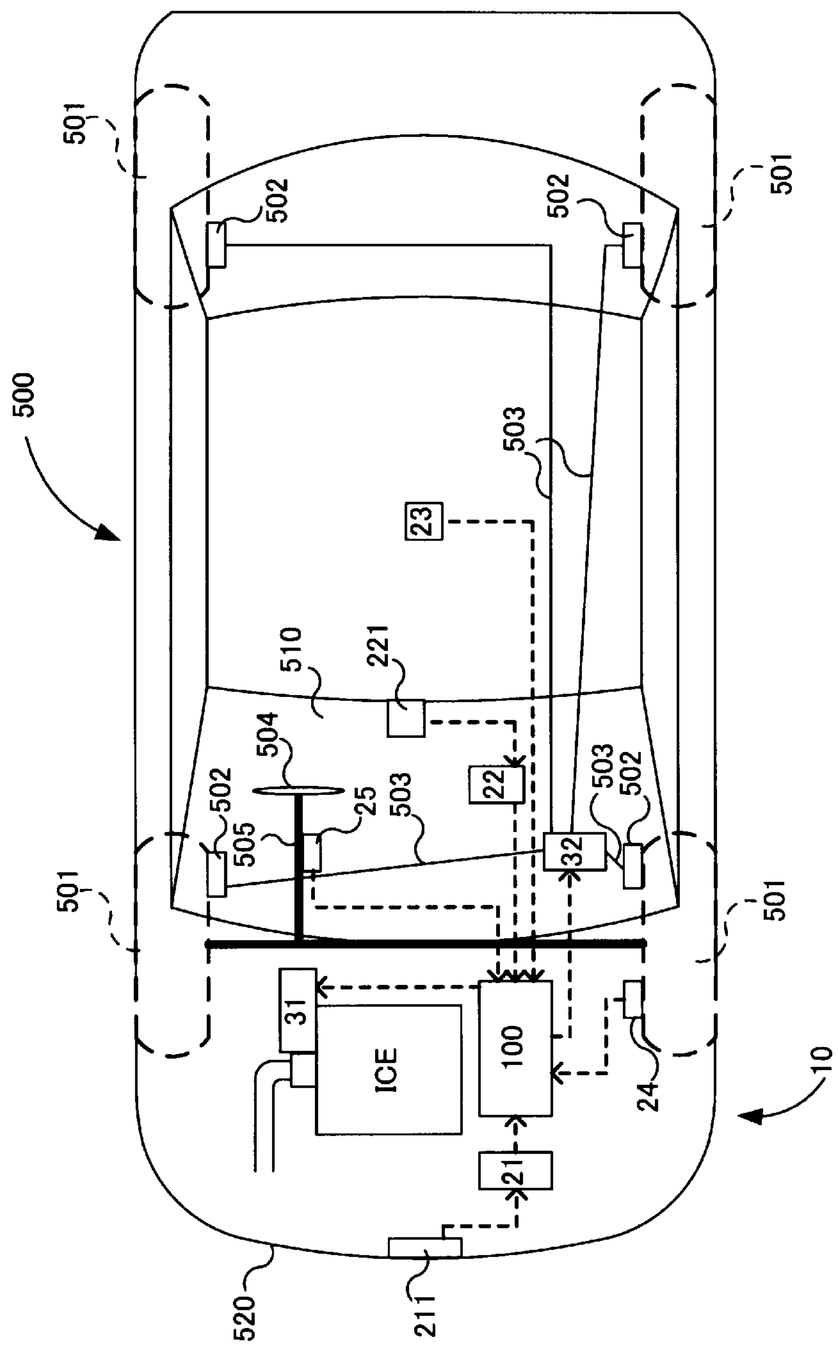
FIG. 1 is a block diagram showing a relationship between constituent elements provided in a vehicle 500.

Vehicle driving assist devices exist in the prior art which recognize three-dimensional objects external to a vehicle based on the output of a millimeter wave radar serving as a sensor and on the output of a camera (PTL 1 and PTL 2). With the technology described in PTL 1, the following process is performed when a three-dimensional object is recognized based on the output from the millimeter wave radar or from the camera, but is not recognized based on the output from the other one of these. A judgement is made, with respect to the sensor based on whose output the three-dimensional object was detected, as to whether that output has the characteristics of erroneous detection which are specific to that sensor (see S103, S105, S106). If the output of the sensor has these characteristics of erroneous detection, then it is judged that erroneous detection has occurred (see S1302 and S1307).

Furthermore with the technology described in PTL 2, if a preceding vehicle was not recognized immediately previously, based on either the output of the millimeter wave radar or the output of the camera, whereas the preceding vehicle is currently recognized based on the output of the camera but is not recognized based on the output of the millimeter wave radar (see S104 and S106), then the following process is executed. Follow-up travel based on the recognized preceding vehicle is not performed (see S107).

[PTL 1] Japan Patent Publication No. 2005-71204

[PTL 2] Japan Patent Publication No. 2005-145396

In the technology of PTL 1 described above, the reliability of the output from the sensor which detects the object is verified, and if the reliability is low, the detection is judged to be erroneous. On the other hand, the reliability of the output of the sensor which has not detected the object is not verified. The assignees of the present invention have found that, as a result, the following problems arise. Not only is the driving assist control of the vehicle not performed when an object is not detected by either of the sensors, but even if the object is detected by a single one of the sensors, that detection may be judged to be erroneous, and as a result, driving assist may not be provided. There are thus many instances in which driving assist fails to be provided.

The inventors have also found that the technology of PTL 2 has the following problems. With the technology of PTL 2, even if a preceding vehicle is recognized based on the output of the camera, follow-up travel with respect to the preceding vehicle based on the output of the camera is not performed if a specific condition is satisfied. For that reason, there are many cases in which driving assist is not provided in the vehicle. Hence it is difficult to continuously provide driving assist, with the technology of PTL 1 or PTL 2.

A driving assist device including a first sensor; a second sensor, the first and second sensors being used for detection of an object in front of the driving assist device; and a control device for executing inter-vehicle distance control using an output of the first sensor or an output of the second sensor to keep an inter-vehicle distance within a predetermined range, the inter-vehicle distance being a distance between a vehicle and at least one preceding object in front of the vehicle.

The control device is configured not to execute the inter-vehicle distance control under a predetermined first condition upon determination that the at least one preceding object is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device is configured to execute the inter-vehicle distance control under a predetermined second condition upon determination that the environment of the non-detection sensor satisfies a second requirement for determination of the reliability of the output of the non-detection sensor, each of the first and second conditions representing that a corresponding level of the reliability of the output of the non-detection sensor, the level of the reliability of the output of the non-detection sensor represented by the second condition being lower than the level of the reliability of the output of the non-detection sensor represented by the first condition.

A. First Embodiment

A1. Configuration of Vehicle 500

As shown in FIG. 1, a vehicle 500 includes an internal combustion engine ICE, wheels 501, braking devices 502, brake lines 503, a steering wheel 504, a steering mechanism 505, a windshield 510, and a front bumper 520.

The vehicle 500 further includes a control device 100, a radar ECU 21, a camera ECU 22, a yaw rate sensor 23, wheel speed sensors 24, a rotation angle sensor 25, a throttle valve drive device 31, and a braking support device 32. The vehicle 500 further includes a millimeter wave radar 211 and a camera ECU 22. In the present specification, the system containing the control device 100, radar ECU 21, camera ECU 22, millimeter wave radar 211, camera ECU 22, throttle valve drive device 31, and braking support device 32 is referred to as the “driving assist device 10”.

The vehicle 500 has four wheels 501. The two front wheels 501 are rotated by power transferred from the internal combustion engine ICE, to move the vehicle 500. The two rear wheels 501 rotate as the vehicle 500 moves. The braking devices 502 perform braking of each wheel 501 by brake fluid pressure that is supplied via a brake line 503, in response to operation of the brake pedal by the driver. A braking device 502 is provided on each wheel 501. Each brake line 503 includes a brake piston and a brake fluid line in which the brake fluid pressure is developed in accordance with brake pedal operation. The steering wheel 504 is connected to the front wheels 501 via a steering mechanism 505 that includes a steering rod.

The millimeter wave radar 211 is a sensor that emits millimeter waves and receives reflected wave that are reflected from an object, for detecting the distance, relative speed and angular to the object. In the present embodiment, the millimeter wave radar 211 is disposed in the center of the front bumper 520.

The front camera 221 is an image capture device that includes an image capture element such as a CCD, and is a sensor that receives visible light and outputs information on the outer shape of an object as image data i.e. a detection result. In the present embodiment, the front camera 221 is disposed in the center of the upper part of the windshield 510. The pixel data that are outputted from the front camera 221 consist of monochrome pixel data or color pixel data.

The radar ECU 21 and the camera ECU 22 are microprocessors, each including a calculation unit, a storage unit, and an input/output unit. The radar ECU 21 is connected to the millimeter wave radar 211. The radar ECU 21 generates a detection signal expressing an object based on reflected waves acquired by the millimeter wave radar 211, and outputs the detection signal to the control device 100. The camera ECU 22 is connected to the front camera 221. The camera ECU 22 uses an image acquired by the front camera 221 and the shape pattern of an object, provided beforehand, to generate a detection signal expressing the object shown by the image, and outputs the detection signal to the control device 100.

The yaw rate sensor 23 detects the angular velocity of rotation of the vehicle 500. The yaw rate sensor 23 is disposed, for example, in the center of the vehicle. The detection signal that is outputted from the yaw rate sensor 23 has a voltage value that is proportional to the rotation direction and the angular velocity.

The wheel speed sensors 24 are sensors that detect the rotation speeds of the wheels 501, and are respectively provided for each wheel 501. The detection signal outputted from a wheel speed sensor 24 is a voltage value that is proportional to the wheel speed, or is a pulse wave expressing an interval that varies in accordance with the wheel speed. The control device 100 can obtain information such as the vehicle speed and distance traveled by the vehicle by using the detection signals from the wheel speed sensors 24.

The rotation angle sensor 25 is a torque sensor that detects the torsional amount generated in the steering rod by operating the steering wheel 504, that is, the steering torque. In the present embodiment, the rotation angle sensor 25 is provided on the steering rod which connects the steering wheel 504 to the steering mechanism. The detection signal outputted from the rotation angle sensor 25 has a voltage value that is proportional to the torsional amount.

The throttle valve drive device 31 is an actuator for controlling the internal combustion engine ICE, and is controlled by the control device 100 to adjust the opening degree of the throttle valve, in accordance with accelerator pedal operation by the driver or irrespective of the accelerator pedal operation by the driver. The throttle valve drive device 31 is, for example, a stepping motor. The throttle valve drive device 31 is equipped with a driver that controls the operation of the actuator based on a control signal from the CPU 101 of the control device 100.

In the present embodiment, the throttle valve drive device 31 is provided in the intake manifold and increases or decreases the rate of air intake of the gasoline engine constituted by the internal combustion engine ICE, in accordance with the control signal from the control device 100.

The braking support device 32 is an actuator for effecting braking by the braking device 502 under control of the control device 100, irrespective of actuation of the brake pedal by the driver. The braking support device 32 is equipped with a driver that controls the operation of the actuator based on a control signal from the CPU 101 of the control device 100. In the present embodiment, the braking support device 32 is provided with brake lines 503, and increases or decreases the hydraulic pressure in the brake lines 503 in accordance with a control signal from the control device 100. The braking support device 32 can control the hydraulic pressure in the brake lines 503 independently of the operation of the brake pedal, thereby effecting braking support. The braking support device 32 consists, for example, of a module that includes an electric motor and a hydraulic piston driven by the electric motor. The braking support device 32 may use a skid prevention device, or a braking control actuator of an existing anti-lock braking system.

The control device 100 uses the throttle valve drive device 31 and the braking support device 32 to maintain the inter-vehicle distance between the preceding vehicle and the own vehicle at a constant value, when there is a preceding vehicle, and to cause the own vehicle to be driven at a set speed when there is no preceding vehicle. Such constant speed travel/inter-vehicle distance control is known as adaptive cruise control (ACC). The constant-speed travel/inter-vehicle distance control process may be abbreviated as "inter-vehicle distance control" in the present specification.

Inter-vehicle distance control is part of the driving assist. The driving assist further includes steering assistance, which controls the steering mechanism 505 independently of actuation of the steering wheel 504 by the driver. These functions are implemented by the control device 100.

It should be noted that the millimeter wave radar 211 of the present embodiment is also referred to as the "first type of sensor". The front camera 221 is also referred to as the "second type of sensor".

A2. Configuration of Control Device 100 and Inter-Vehicle Distance Control

Figure 2:
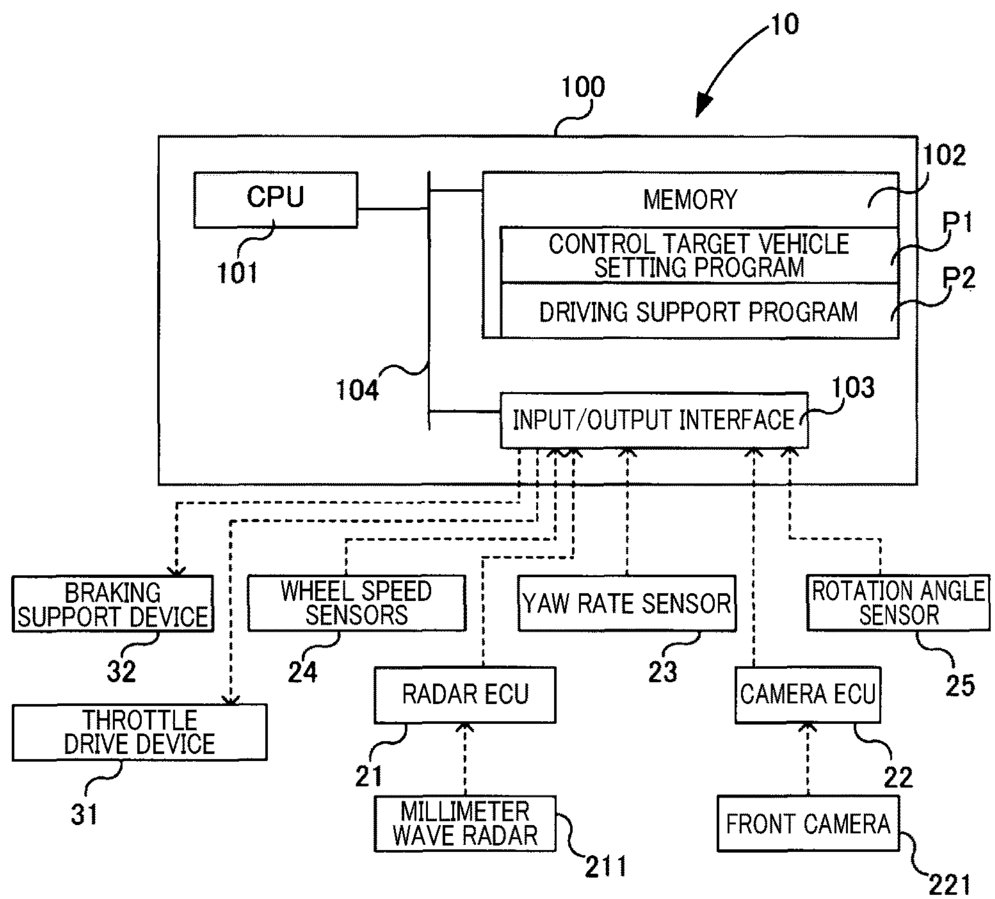
FIG. 2 is a block diagram showing a relationship between a control device 100 and other components.

As shown in FIG. 2, the control device 100 includes a central processing unit 101 (hereinafter also referred to as "CPU 101"), a memory 102, an input/output interface 103, and a bus 104. The CPU 101, the memory 102, and the input/output interface 103 are connected via the bus, and bidirectional communication is enabled. The control device 100 uses the output of the millimeter wave radar 211 and the output of the front camera 221 to execute inter-vehicle distance control of the vehicle 500 such that the distance between the vehicle 500 and a preceding vehicle in front of the vehicle 500 is within a predetermined range.

The memory 102 includes a ROM, which is a memory that cannot be read and written into by the CPU 101, and a RAM, which is a memory that can be read and written into by the CPU 101. The ROM stores a control target vehicle setting program P1, for setting a control target vehicle that is the target of the driving assist control, and a driving assist control program P2 for executing the driving assist control. The CPU 101 implements the function of setting the controlled vehicle by developing the control target vehicle setting program P1 stored in the ROM in the RAM, and executing the program. The CPU 101 implements the driving assist control by developing the driving assist control program P2 stored in the ROM in the RAM, and executing the program.

The radar ECU 21, the camera ECU 22, the yaw rate sensor 23, the wheel speed sensor 24, the rotation angle sensor 25, the throttle valve drive device 31, and the braking support device 32 are connected to the input/output interface 103 via respective control signal lines. Detection signals are inputted to the input/output interface 103 from the radar ECU 21, the camera ECU 22, the yaw rate sensor 23, the wheel speed sensor 24, and the rotation angle sensor 25. A control signal for commanding the degree of opening of the throttle valve is outputted from the input/output interface 103 to the throttle valve drive device 31. A control signal which commands the degree of braking is outputted from the input/output interface 103 to the braking support device 32.

The unprocessed detection signal that is outputted from the millimeter wave radar 211 is processed in the radar ECU 21, and is inputted to the control device 100 as a first detection signal, which defines a point or a series of points expressing one or more representative positions on an object.

Image data that are outputted from the front camera 221 are subjected to feature point extraction processing in the camera ECU 22. A pattern expressed by extracted feature points is compared with a comparison pattern, which indicates the outer shape of a vehicle, that is, the outer shape of an object which has been set as a predetermined control target. If the extraction pattern and the comparison pattern match or are similar to each other, a frame image that contains a determined object is generated. On the other hand if the extracted pattern and the comparison pattern do not match and are not similar, no frame image is generated.

If the image data include a plurality of objects, a plurality of frame images which contain the determined objects are generated by the camera ECU 22, and inputted to the control device 100 as a second detection signal. Each frame image is expressed by pixel data and includes position information on the determined objects, that is, coordinate information.

Figure 3:
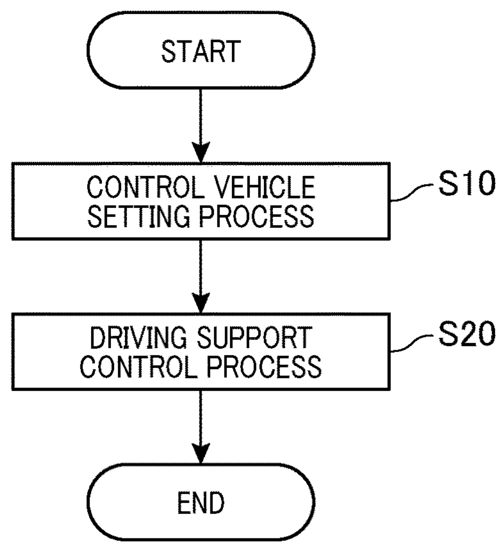
FIG. 3 is a flowchart showing a flow of a setting processing of a vehicle to be controlled and driving assist control processing executed by the control device 100.

As shown in FIG. 3, after starting of the vehicle control system, the driving assist device 10 executes a controlled vehicle setting process (S10) and a driving assist control process (S20). The processing routine shown in FIG. 3 is repeatedly executed at predetermined time intervals, from the time of starting to the time of stopping the vehicle control system, or from the time of turning on the vehicle starter switch until the starter switch is turned off, for example. The CPU 101 (see FIG. 2) executes the control target vehicle setting program P1 to execute the control target vehicle setting process (S10). The CPU 101 executes the driving assist control program P2 to execute the driving assist control process (S20).

It should be noted that in FIG. 3, the control target vehicle setting process S10 and the driving assist control process S20 are included in the same process flow, for ease of explanation. However the control target vehicle setting process S10 and the driving assist control process S20 may be independently executed, at different timings.

The driving assist control process S20 includes, for example, an inter-vehicle distance control process, a braking support process, and a steering support process. The braking support process includes sudden braking and gentle braking, for avoiding a collision by the controlled vehicle. The steering support process includes steering for avoiding a collision by the controlled vehicle and steering for preventing lane departure.

The flow of information between respective constituent elements in the controlled vehicle setting process (S10 in FIG. 3) and in the driving assist control process (S20 in FIG. 3) will be described using FIG. 4. If the radar ECU 21 detects an object in front of the vehicle 500, as a result of the recognition processing performed based on the output of the millimeter wave radar 211, the control device 100 receives the first detection signal from the radar ECU 21, expressing the object. If the camera ECU 22 detects an object in front of the vehicle 500, as a result of the recognition processing performed based on the output from the front camera 221, the control device 100 receives the second detection signal, expressing the object, from the camera ECU 22.

If the control device 100 receives both the first detection signal and the second detection signal, it performs fusion processing, using the first detection signal and the second detection signal. More specifically, the CPU 101 of the control device 100 determines the position coordinates of respective reflection points indicating an object, inputted from the radar ECU 21, and the position coordinates of a recognized vehicle contained in an image frame conveyed by the detection signal that is inputted from the camera ECU 22, and if the position coordinates of the object and the position coordinates of the vehicle can be associated, the detection results are integrated. A flag expressing "fusion history exists", indicating that the object has been judged to be a vehicle based on the first detection signal and the second detection signal, is then linked to the object. An object that has been recognized as a vehicle based on the first detection signal and the second detection signal is also referred to as a "fusion target" in the present specification. In addition, "fusion" may be abbreviated to "FSN" in the present specification and drawings.

On the other hand if the first detection signal and the second detection signal are received, but a vehicle corresponding to the position coordinates of the reflection points expressing the object does not appear in the image frame(s), so that there is no association of the object with a vehicle, the CPU 101 links a flag expressing "no fusion history" with the object. In addition, if one of the first detection signal and the second detection signal is received but the other detection signal is not received, the CPU 101 of the control device 100 links a flag expressing "no fusion history" to the object in the other detection signal. An object that has been judged to be a vehicle based only on the first detection signal is also referred to as a "millimeter wave-only target" in the present specification. An object that has been judged to be a vehicle based only on the second detection signal is also referred to as a "camera-only target" in the present specification.

Figure 4:
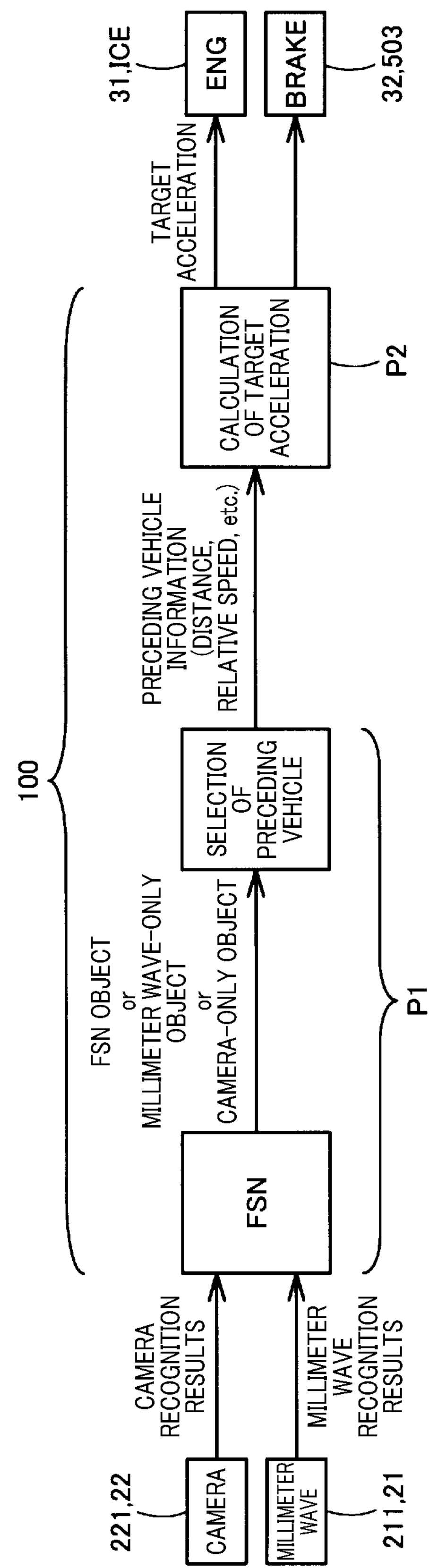
FIG. 4 is a diagram showing a flow of information between respective components in the vehicle control setting process and the driving assist control process.

The processing executed by the control device 100 on an object for selecting a preceding vehicle differs in accordance with whether the detected object is a fusion target, a millimeter wave-only target, or a camera-only target (see center of FIG. 4). In other words, the control device 100 selects a preceding vehicle by executing processing that differs in accordance with whether a vehicle in front of the vehicle 500 has been detected based on the output from the millimeter wave radar 211 and/or has been detected based on the output from the front camera 221. In the subsequent driving assist control, the vehicle 500 follows the selected preceding vehicle. The process of selecting the preceding vehicle is described in detail hereinafter.

The fusion process and the process of selecting the preceding vehicle are performed in the control target vehicle setting process (see S10 in FIG. 3 and P1 in FIG. 2).

After selecting a preceding vehicle, the control device 100 calculates a target value of acceleration of the vehicle 500, based on the distance between the vehicle 500 and the preceding vehicle and on the relative speed of the vehicle 500 and the preceding vehicle. The control device 100 then transmits information on the target acceleration to the throttle valve drive device 31 and the braking support device 32. The throttle valve drive device 31 controls the rate of air intake of the internal combustion engine ICE, based on the information received on the target acceleration. The braking support device 32 controls the hydraulic pressure in the brake lines 503 based on the information received on the target acceleration. These processes are performed in the driving assist control process (see S20 of FIG. 3 and P2 of FIG. 2).

A specific embodiment of the inter-vehicle distance control will be described referring to FIG. 5. If an object in front of the vehicle 500 is detected by both of the radar ECU 21 and the camera ECU 22 based on the outputs from their sensors (see C11 in FIG. 5), then the fusion process described above is performed, a preceding vehicle to be followed by the vehicle 500 is determined from within the fusion target, and inter-vehicle distance control is performed (see FIG. 4).

On the other hand, if no object is detected in front of the vehicle 500 based on either of the sensor outputs of the radar ECU 21 and the camera ECU 22 (see C22 in FIG. 5), the inter-vehicle distance control is not performed. Constant speed travel control is then executed for causing the vehicle 500 to travel at a constant speed. In FIG. 5, the case in which the constant speed travel control is performed is indicated by "x".

If an object in front of the vehicle 500 is detected based on the sensor output of one of the radar ECU 21 and the camera ECU 22, but is not detected based on the sensor output of the other one (see FIG. 5, C12 and C21), the controller 100 performs processing that differs in accordance with whether the millimeter wave radar 211 or the front camera 221 is in an unstable environment.

A process for determining the contents of the inter-vehicle distance control in accordance with whether the millimeter wave radar 211 or the front camera 221 is in an unstable environment will be described referring to FIG. 6. The process shown in FIG. 6 is performed by the control device 100.

In step S110, the control device 100 judges whether both of the radar ECU 21 and camera ECU 22 detect an object in front of vehicle 500 based on their sensor outputs. If the judgement result is Yes, the process proceeds to step S210. The state in which the judgement result of step S110 is Yes and the process of step S210 is executed corresponds to C11 of FIG. 5.

In step S210, the fusion process is performed as described above, a preceding vehicle that is to be followed by the vehicle 500 is determined from within the fusion target, and the inter-vehicle distance control is performed. The inter-vehicle distance control performed at this time is also referred to as "normal inter-vehicle distance control". In FIG. 5, the case in which the normal inter-vehicle distance control is performed is indicated by "○".

If the judgement result in step S110 is No, the process proceeds to step S120. In step S120, the control device 100 judges whether the radar ECU 21 detects an object in front of the vehicle 500 based on the output of the millimeter wave radar 211. If the judgement result is Yes, the process proceeds to step S130. A judgement result of Yes in step S120 corresponds to C12 of FIG. 5.

In step S130, the control device 100 judges whether the recognition result obtained by the radar ECU 21 based on the output of the millimeter wave radar 211 is highly reliable. More specifically, the judgement is based on a plurality of judgement criteria such as (i) whether the power of the reflected millimeter waves exceeds a predetermined threshold value, (ii) whether the fluctuation in power of the reflected millimeter waves is lower than a predetermined fluctuation threshold value, and (iii) whether the size of a single object in the depth direction, obtained from the reflected waves of that object, exceeds a depth threshold. The depth of an object is obtained by the reflected waves that are reflected from the bottom of the object. For example, if the object is a vehicle, the depth of the object has a predetermined size. On the other hand, if the object is a signboard, the depth of the object is not detected, or a depth smaller than that of a general type of vehicle is detected. If the judgement result is Yes, the process proceeds to step S210. The state in which the judgement result of step S130 is Yes and the process of step S210 is executed corresponds to C12U in FIG. 5.

If the judgement result in step S130 is No, the process proceeds to step S140. In step S140, the control device 100 judges whether the environment of the front camera 221 satisfies a camera instability condition, indicating that the front camera 221 is in an unstable environment, in which the output of the front camera 221 is low in reliability. If the judgement result is Yes, the process proceeds to step S220. The state in which the judgement result of step S140 is Yes and the process of step S220 is executed corresponds to C12LL of FIG. 5.

That is, if a preceding vehicle is detected in front of the vehicle 500 based on the output of the millimeter wave radar 211 and a preceding vehicle is not detected in front of the vehicle 500 based on the output of the front camera 221 (S120: Yes, C12), while furthermore the environment of the front camera 221 satisfies the second condition, indicating that the reliability of the output of the front camera 221 is low (S140: Yes), then the control device 100 executes the inter-vehicle distance control under a predetermined condition (S130: No) based on the output of the millimeter wave radar 211, which is the sensor based on whose output the preceding vehicle is detected (S220, C12LL).

In step S220, the control device 100 performs inter-vehicle distance control which is different from that of step S210. That is, in the inter-vehicle distance control of step S220, the parameters that define the motion of vehicle 500 are set such that the motion of the vehicle 500 becomes slower than in the inter-vehicle distance control of step S210. The setting of the parameters that define the motion of the vehicle 500 are described in detail hereinafter. The inter-vehicle distance control executed in step S220 is also called "weak tracking control".

By performing such processing, when performing inter-vehicle distance control based on the output of the millimeter wave radar 211 whose reliability is low (S140: Yes), not on the output of the front camera 221 (S110: No), it becomes possible to prevent unnatural motion of the vehicle 500 due to erroneous detection by the radar ECU 21, etc.

If the judgement result in step S140 is No, the process proceeds to step S230. The state in which the judgement result of step S140 is No and the process of step S230 is executed corresponds to C12LR of FIG. 5.

In step S230, the control device 100 executes constant speed travel control, for causing the vehicle 500 to travel at a constant speed.

That is, if a preceding vehicle is detected in front of the vehicle 500 based on the output of the millimeter wave radar 211 but a preceding vehicle is not detected in front of the vehicle 500 based on the output of the front camera 221 (S120: Yes, C12), while also the environment of the front camera 221 which is a sensor based on whose output a preceding vehicle is detected satisfies the first condition indicating that the reliablity of the output of the front camera 221 is not low (S140: No), the device 100 does not perform the inter-vehicle distance control under the predetermined condition (S130: No) (S230, C12LR).

If the environment of the front camera 221 does not satisfy the camera instability condition which indicates that the output of the front camera 221 is unreliable (S140: No), the camera ECU 22 can infer that the judgment "no preceding vehicle" has been reached under a condition of comparatively high reliability. Furthermore, the judgement of "preceding vehicle" by the radar ECU 21 is not highly reliable (S130: No). Hence in such a situation, it is very possible that the judgement of "preceding vehicle" by the radar ECU 21 is in error. Therefore in such a case, the vehicle 500 can be safely driven by executing the constant speed travel control (S230), instead of causing the vehicle 500 to follow a preceding vehicle.

If the judgement result in step S120 is No, the process proceeds to step S150. In step S150, the control device 100 judges whether the recognition result obtained by the camera ECU 22 based on the output of the front camera 221 is highly reliable. If the judgement result is No, the process proceeds to step S230. The state in which the judgement result of step S150 is No and the process of step S230 is executed corresponds to C22 of FIG. 5.

If the judgment result in both of steps S120 and S150 is No, this signifies that there is a high probability that there is no preceding vehicle. Hence in such a case, the vehicle 500 can be safely driven by executing the constant speed travel control (S230).

If the judgement result in step S150 is Yes, the process proceeds to step S160. In step S160, the control device 100 judges whether the recognition result of camera ECU 22 based on the output of front camera 221 is highly reliable. More specifically, the reliability of the recognition result of the camera ECU 22 is determined as follows. When object recognition is executed by the camera ECU 22, if the degree of matching between data expressing an object and a shape within an image acquired by the camera exceeds a predetermined recognition threshold value, where the data expressing the object are in dictionary data that have been prepared beforehand, then it is judged that the object in the dictionary data appears within the image. If the degree of matching between the object thus determined and the data in the dictionary data is higher than a confidence threshold, then the control device 100 judges that the recognition result from the camera ECU 22 is highly reliable. On the other hand, if the degree of matching between the data in the dictionary data and the object is lower than the confidence threshold, the control device 100 judges that the recognition result from the camera ECU 22 is low in reliability. The confidence threshold is set to a higher value than the recognition threshold. If the judgement result is No, the process proceeds to step S230. The state in which the judgement result of step S160 is No and the process of step S230 is executed corresponds to C21R of FIG. 5.

The radar ECU 21 judges that there is no preceding vehicle (S120: No). Furthermore the judgement of "preceding vehicle" by the camera ECU 22 is not highly reliable (S160: No). Therefore in such a situation, it is highly possible that the determination of "preceding vehicle present" by the camera ECU 22 is incorrect. Hence in such a case, the vehicle 500 can be safely driven by executing the constant speed travel control (S230) instead of causing the vehicle 500 to follow a preceding vehicle.

If the judgement result in step S160 is Yes, the process proceeds to step S170. In step S170, the control device 100 judges whether the environment of the millimeter wave radar 211 satisfies the radar instability condition, indicating that the environment of the output of the millimeter wave radar 211 is unstable. If the judgement result is Yes, the process proceeds to step S210. The state in which the judgement result of step S170 is Yes and the process of step S210 is executed corresponds to C21LU of FIG. 5.

That is, if a preceding vehicle is detected in front of the vehicle 500 based on the output of the front camera 221, and the preceding vehicle is not detected in front of the vehicle 500 based on the output of the millimeter wave radar 211 (S150: Yes, C21), while also the environment of the millimeter wave radar 211 satisfies a second condition concerning the reliability of the output of the millimeter wave radar 211, where the second condition indicates a lower reliability of the output of the millimeter wave radar 211 than when the first condition is satisfied (S170: Yes), then under a predetermined condition (S160: Yes), the control device 100 executes the inter-vehicle distance control based on the output of the front camera 221, where the front camera 221 is a sensor based on whose output a preceding vehicle is detected (S210, C21LU).

If the environment of the millimeter wave radar 211 satisfies the radar instability condition, indicating that the output of the millimeter wave radar 211 is low in reliability (S170: Yes), then the judgement made by the radar ECU 21 of "no preceding vehicle" (S120: No) is not reliable. On the other hand, the camera ECU 22 makes the judgement "preceding vehicle exists" with high reliability (S150, S160: Yes). Thus in such a situation, it is very possible that the judgement made by the radar ECU 21 of "no preceding vehicle" is in error. Hence by executing the normal follow-up travel control (S210) in such a case, the vehicle 500 can perform the normal follow-up travel control at a high frequency. That is to say, the probability of interruption of the normal following travel control can be decreased.

It should be noted that the control device 100 performs respectively different inter-vehicle distance control in the case in which the processing of step S210 is executed after passing through S170 of FIG. 6 (see C21LU of FIG. 5) and the case in which the processing of step S210 is executed after makes a Yes decision is made in S110 or in S130. This is also true for the case in which the process of step S210 is executed after passing through step S180 of FIG. 6 (see C21LL of FIG. 5). That is, if a preceding vehicle is detected in front of the vehicle 500 based on the output of the front camera 221, but the preceding vehicle is not detected in front of the vehicle 500 based on the output of the millimeter wave radar 211, and the environment of the millimeter wave radar 211 is such that the output of the millimeter wave radar 211 is low in reliability (S170: Yes, C21LU), then the control device 100 executes inter-vehicle distance control that is different from the inter-vehicle distance control (C11, C12U) executed when a preceding vehicle is detected in front of the vehicle 500 based on the output of the millimeter wave radar 211.

That is, (i) In the inter-vehicle distance control of C21LU of FIG. 6, which is performed based on the output of the front camera 221, parameters which define the motion of the vehicle 500 are set such that the motion becomes slower than for the inter-vehicle distance control of C11, C12U. (ii) In the inter-vehicle distance control of C21LU, the threshold parameters used in determining the preceding vehicle that is to be the object of control of the vehicle 500, such as to maintain the distance between that preceding vehicle and the vehicle 500 within a predetermined range, are set to values that are different from the threshold value parameters that are set for the inter-vehicle distance control of C11, C12U. The setting of each parameter is described in detail hereinafter.

If the judgement result in step S170 is No, the process proceeds to step S180. In step S180, the control device 100 determines whether the current judgement of "preceding vehicle" is the initial selection of this judgement. If the current judgement of "preceding vehicle" is "initial selection", this signifies that control for following the preceding vehicle (see S210 and S220) has not been performed until now, and that the judgement "preceding vehicle" has been reached in the current execution of this process.

If the judgement result in step S180 is No, the process proceeds to step S210. The state in which the judgement result reached in step S180 is No and the process of step S210 is then executed corresponds to C21LL of FIG. 5. Similarly when the process of step S210 is executed after passing through S180 of FIG. 6 (see C21LL of FIG. 5), the same inter-vehicle distance control is executed as when the process of step S210 is executed after passing through S170 of FIG. 6 (see C21LU of FIG. 5).

The radar ECU 21 judges that there is no preceding vehicle (S120: No). If the environment of the millimeter wave radar 211 does not then satisfy the radar instability condition which indicates that the output of the millimeter wave radar 211 is low in reliability (S170: No), it can be inferred that the judgement "no preceding vehicle" has been made by the radar ECU 21 with a relatively high reliability. On the other hand, the camera ECU 22 makes the judgement "preceding vehicle present" with high reliability (S150, S160: Yes). Even with such contradictory judgement results, if the "preceding vehicle present" judgement was also made immediately previously (S180: No), the "preceding vehicle present" judgement by the camera ECU 22 has a high probability of being correct. Hence by performing the normal follow-up travel control (S210) in such a case, the vehicle 500 can execute the normal inter-vehicle distance control at a high frequency. That is to say, the probability of interruption of the normal follow-up travel control can be decreased.

If the judgement result in step S180 is Yes, the process proceeds to step S230. The state in which the judgement result of step S180 is Yes, and the process of step S230 is then executed, corresponds to C21LL of FIG. 5.

That is, when a preceding vehicle is detected in front of the vehicle 500 based on the output of the front camera 221, but is not detected based on the output of the millimeter wave radar 211 (S150: Yes, C21), while the environment of the millimeter wave radar 211, which is a sensor that has not detect a preceding vehicle, satisfies a first condition, indicating that the reliability of the output of the millimeter wave radar 211 is not low (S170: No), then the control device 100 does not execute the inter-vehicle distance control (S230, C21LL) under the predetermined condition (S160: Yes, S180: Yes).

As described above, in the state of step S180, the radar ECU 21 has made the judgement "no preceding vehicle" with high reliability (S120, S170: No), while on the other hand the camera ECU 22 has made the judgement "preceding vehicle is present", also with high reliability (S150, S160: Yes). However, if the judgement "no preceding vehicle" was made immediately previously (S180: Yes) then it is highly probable that the judgement "no preceding vehicle" by the radar ECU 21 is correct. Hence in such a case the vehicle 500 can be safely driven by executing the constant speed travel control (S230), instead of causing the vehicle 500 to follow a preceding vehicle.

Figure 7:
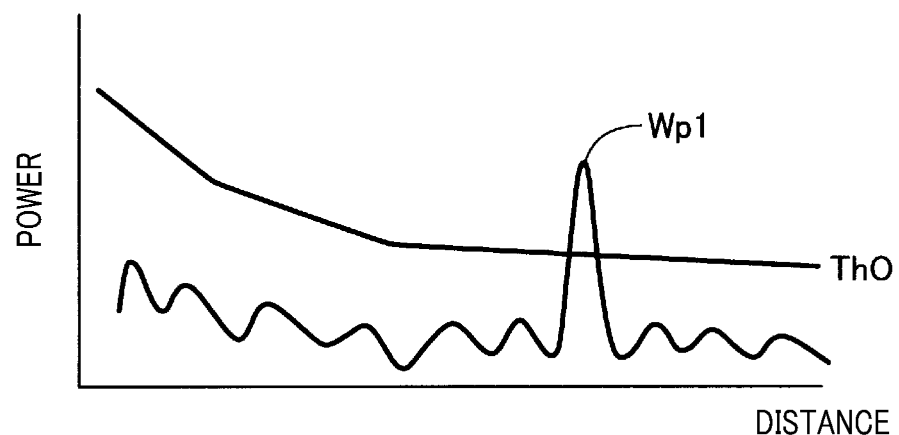
FIG. 7 is a graph showing the output of a millimeter wave radar 211 when the millimeter wave radar 211 is in a stable environment in which the output of the millimeter wave radar 211 is highly reliable.
Figure 8:
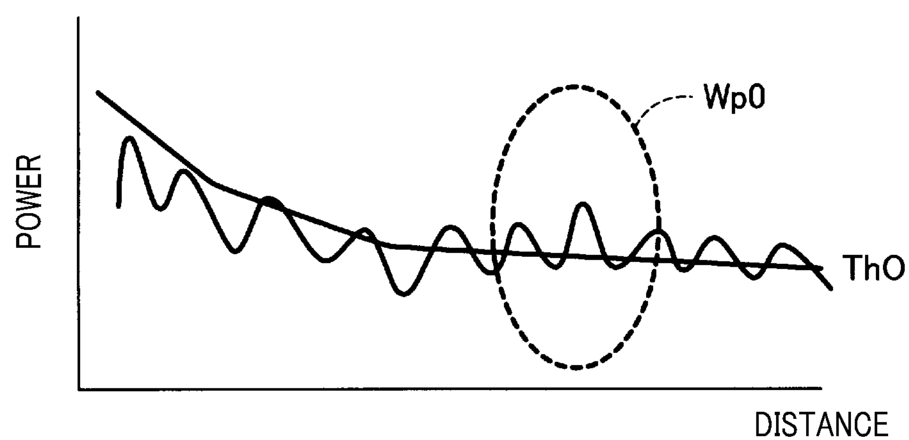
FIG. 8 is a graph showing the output of the millimeter wave radar 211 when in an unstable environment, in which the output of the millimeter wave radar 211 is low in reliability.

A3. Judging the Reliability of Determining the Presence of a Preceding Vehicle (1) Judgment of the Reliability of Recognition Results from the Radar ECU 21 Based on Output of Millimeter Wave Radar 211:

Judgement of the reliability of the recognition results from the radar ECU 21, based on the output of the millimeter wave radar 211, will be described referring to FIGS. 7 and 8 (see S170 in FIG. 6). In FIGS. 7 and 8, the horizontal axis values express the distance from the vehicle to an object. The vertical axis values express the power of reflected waves that are reflected from an object.

The output of the millimeter wave radar 211 will be described referring to FIG. 7, for the case in which the millimeter wave radar 211 is in a stable environment, where the output of the millimeter wave radar 211 is highly reliable. When the environment of the millimeter wave radar 211 is stable, so that the output of the millimeter wave radar 211 is highly reliable, then in the output of the millimeter wave radar 211, the signal expressing reflected waves increases specifically when the waves are reflected from an specific object (see wave Wp1 in FIG. 7). Hence by setting respective threshold values ThO of reflected wave power in accordance with distance beforehand, it can be judged that there is some type of object at the position that is the irradiation destination of the millimeter wave radar 211, if the power corresponding to that position exceeds the threshold value ThO which corresponds to the distance of that position.

The output of the millimeter wave radar 211 when in an unstable environment, where the output of the millimeter wave radar 211 is low in reliability, will be described referring to FIG. 8. If the millimeter wave radar 211 is in an unstable environment where the output thereof has low reliability, the output exhibits increases in magnitude for many different distances, and the power of the signal expressing the reflected waves that are reflected from an actual object is not greatly different from the signal power at other parts (see the region Wp0 in FIG. 7 and the wave Wp1 in FIG. 7). Examples of such an environment include for example the interior of a tunnel, a position next to a sound barrier, or a position below an elevated structure. In these environments, many reflected waves are generated by various structures such as tunnel walls, soundproof walls, and elevated buildings, so that it is difficult to distinguish between the reflected waves thereby and the waves that are reflected from an actual object.

Hence for example, a radar instability condition, indicating that the environment of the millimeter wave radar 211 is unstable and that the reliability of the output thereof is low, can be set as a condition in which the power of the reflected waves exceeds the threshold ThO at a distance equal to or greater than a predetermined number. As an alternative example, the radar instability condition may be set as a condition in which the power (that is, energy) of the reflected waves, integrated with respect to distance from the vehicle 500, exceeds a predetermined threshold value.

It should be noted that in the present embodiment, the judgement in step S130 of FIG. 6 is made based on the magnitude of power of the reflected millimeter waves. However, the judgement in step S130 of FIG. 6 may also be performed by using the negative condition of the radar instability condition used in step S170. That is, in step S130, the control device 100 can make a Yes (high reliability) judgement if the radar instability condition is not satisfied, and make a No (low reliability) judgement if the radar instability condition is satisfied. Furthermore the judgement criteria used in step S130 and in step S170 of FIG. 6 could be respectively different, for example with the values of the threshold ThO, etc., being respectively different.

(2) Judgment of Reliability of the Recognition Result of the Radar ECU 21 Based on the Output of the Front Camera 221:

As described above, the reliability of the output of the millimeter wave radar 211 is low when in some specific environments, such as in a tunnel. The control device 100 can judge whether the vehicle 500 is in an environment such as a tunnel, next to a sound barrier or under an overpass, based on images captured by the front camera 221. Hence the control device 100 can judge, based on the images acquired by the front camera 221, the reliability of the recognition results obtained by the radar ECU 21. This judgement method can also be applied to the judgements made in step S130 and in step S170 of FIG. 6.

(3) Judgment of Reliability of the Recognition Result of Front Camera 221 Based on the Output of Front Camera 221:

Judgement of the reliability of the recognition results from the front camera 221 based on the output of the front camera 221 will be described (see S140 in FIG. 6). An unstable environment in which the output of the front camera 221 is unreliable is, for example, night time, or an environment in which rain or snow is falling. Hence for example, the fact that the illuminance calculated from the image acquired by the front camera 221 is lower than a predetermined threshold can be made a camera instability condition, indicating that the front camera 221 is in an unstable environment in which the output of the front camera 221 is unreliable. Furthermore the fact that the operating lever (not shown in FIG. 1) of the windscreen wiper is turned on can be made a camera instability condition.

It should be noted that in the present embodiment, the judgement in step S160 in FIG. 6 is made based on the degree of matching with data that are within the dictionary data. However it would be equally possible for the judgement made in step S160 of FIG. 6 to be performed by employing the negative condition of the camera instability condition used in step S140. That is, in step S160, the control device 100 would makes the Yes (high reliability) judgement if the camera instability condition is not satisfied, and make the No (low reliability) judgement if the camera instability condition is satisfied. Furthermore the criteria for the judgements made in step S160 and in S140 of FIG. 6 may be made respectively different, for example respectively different threshold values of illuminance.

A4. Determining the Distance Between a Vehicle and a Preceding Vehicle by Using the Front Camera The radar ECU 21 can determine the distance between the vehicle 500 and a preceding vehicle from the power of the reflected waves at each of respective distances from the millimeter wave radar 211 (see Wp1 in FIG. 7). On the other hand, the camera ECU 22 cannot directly obtain the distance between the vehicle 500 and a preceding vehicle from the images received from the front camera 221. A method whereby the camera ECU 22 determines the distance between the vehicle 500 and a preceding vehicle based on the images received from the front camera 221 is described hereinafter. Such a process is executed when normal inter-vehicle distance control is performed in S210 after passing through S150 to S170 or through S150 to S180 in FIG. 6.

Figure 9:
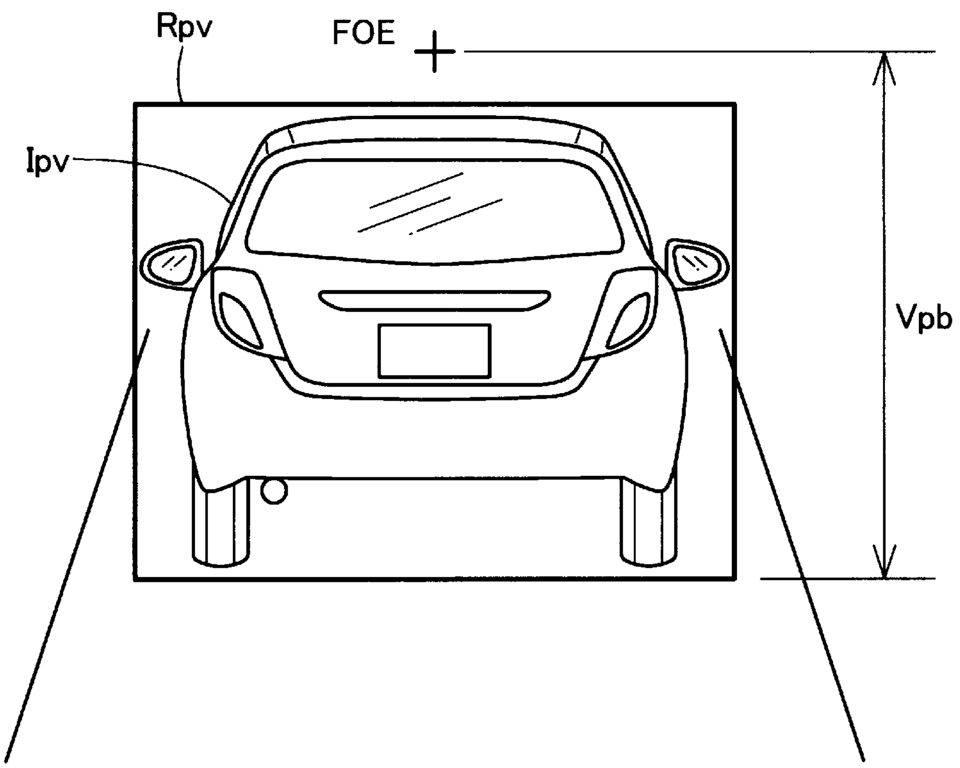
FIG. 9 is a diagram for explaining the principles of measuring a lower edge distance.

(1) Lower Edge Distance:

The "lower edge distance" will be explained using FIG. 9. The image Ipv of a preceding vehicle is included in an image acquired by the front camera 221 (see S150 in FIG. 6). The control device 100 identifies a rectangular region Rpv surrounding the image Ipv of the preceding vehicle as being a region where the preceding vehicle is present within the image. The rectangular region Rpv is the smallest rectangle that can surround the image Ipv of the preceding vehicle. On the other hand, the control device 100 identifies the vanishing point (FOE: Focus Of Expansion) in the image. The "vanishing point" can be determined as the intersection of straight lines that are obtained by extending the motion vectors of respective points in the image.

The angle of depression Av from the lower edge of the preceding vehicle to the vanishing point FOE, that is, from the lower edge of the rectangular region Rpv to the vanishing point, having as its origin the front camera 221 (see FIG. 1), can b e estimated based on the height (number of pixels) Vpb from the lower edge of the preceding vehicle to the vanishing point FOE. On the other hand, the height Hc from the ground of the optical center of the front camera 221 is known. Hence the distance Dpv1 from the preceding vehicle is obtained as:

$$Dpv1=Hc/\tan(Av).$$

The distance Dpv1 to a preceding vehicle obtained by such a method is referred to as the "lower edge distance" in the present specification.

The principles of determining the lower edge distance are described above. However when actually obtaining the lower edge distance, the positional relationship between the image of the preceding vehicle and the frame of the rectangular region Rpv that has been set for the image of the preceding vehicle, each pitch of the optical axis of the camera with respect to the travel direction of the vehicle, etc., are taken into consideration.

Due to the measurement principles, if the pitch angle of the vehicle 500 with respect to the horizontal plane is different from the pitch angle of the preceding vehicle with respect to the horizontal plane, the lower edge distance will contain an error, wherein the vehicle 500 is equipped with the front camera 221.

(2) Width Distance:

The "width distance" will be explained using FIG. 10. The width Wv of each vehicle traveling on a road is within a certain range. Furthermore the angular width Aw of a preceding vehicle Vp can be obtained from the angular range Apv occupied by the preceding vehicle Vp in an image in the horizontal direction. Hence the distance Dpvw to the preceding vehicle Vp can be obtained from the angular width Aw of the preceding vehicle Vp as:

$$Dpvw=Wv/[2\tan(Aw/2)].$$

The distance Dpvw to the preceding vehicle Vp obtained by such a method is referred to as the "width distance" in the present specification.

Due to the measurement principles, if the width of the preceding vehicle is different from the assumed value Wv, for example if the preceding vehicle is a large truck, the width distance will contain an error.

A5. Selection of a Preceding Vehicle Based on an Image from the Front Camera 221

The process of selecting a preceding vehicle based on an image from the front camera 221 (see the center of FIG. 4) will be described. This form of process is performed when the normal inter-vehicle distance control is executed in S210 after passing through S150 to S170 or through S150 to S180 in FIG. 6.

Figure 10:
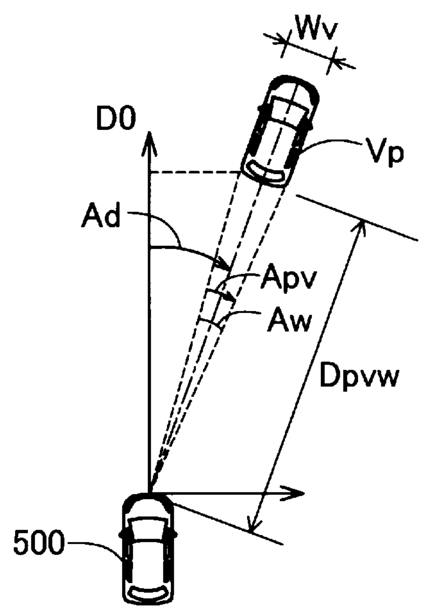
FIG. 10 is a diagram for explaining the principles of measuring a width distance.

The control device 100 determines the azimuth Ad of the preceding vehicle Vp, with respect to the forward direction DO of the vehicle 500, from the angular range Apv occupied by the preceding vehicle Vp in an image from the front camera 221 in the horizontal direction (see FIG. 10).

Figure 11:
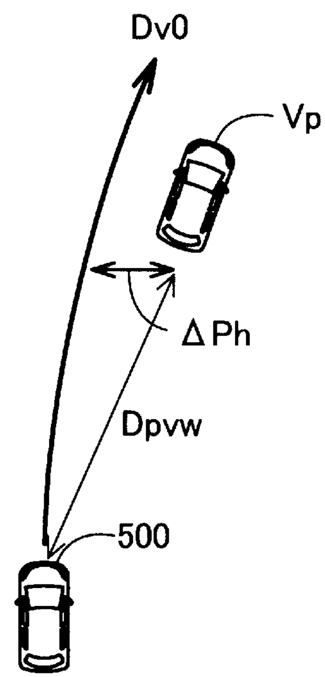
FIG. 11 is a plan view showing an offset lateral position $\Delta Ph$ of a preceding vehicle.

As shown in FIG. 11, the control device 100 calculates the amount of deviation ΔPh (hereinafter referred to as the lateral offset amount ΔPh) of the preceding vehicle Vp from the forward direction Dv0 of the vehicle 500, using the azimuth angle Ad, the width distance Dpvw of the preceding vehicle Vp and the forward direction Dv0 of the vehicle 500. Information on the travel direction Dv0 of the vehicle 500 is obtained from the output of a yaw rate sensor 23 (see FIGS. 1 and 2) that detects the angular velocity of rotation of the vehicle 500, from the direction of a white line on the road, obtained by recognition within the images from the front camera 221, and from vehicle history information based on the fusion information, etc.

When the offset lateral positions ΔPh of more than one preceding vehicle Vp are obtained in this way, the control device 100 selects, as a candidate object of follow-up travel, each preceding vehicle Vp whose offset lateral position ΔPh is equal to or less than a predetermined threshold value Thph.

The width distance Dpvw to an object located ahead, which is determined based on the angular range Apv occupied in the horizontal direction by the object, is not affected by a difference between the pitch-direction orientation of the object and the pitch-direction orientation of the own vehicle. Hence by determining a candidate preceding vehicle to be followed based on the width distance Dpvw, even if the inclination of the road varies, a preceding vehicle having an amount of deviation ΔPh from the travel direction Dv0 of the vehicle 500 that is less than the threshold value can be appropriately determined.

The width distance Dpvw is affected by the actual size of the preceding vehicle Vp in the horizontal direction. However, in the case of a vehicle that has been manufactured in accordance with the regulations and which carries persons when traveling on a road, the actual size in the horizontal direction is also within a predetermined range. Hence by narrowing down only those preceding vehicles Vp having an amount of deviation ΔPh from the travel direction of the vehicle 500 which is less than the threshold value, it is unlikely that a preceding vehicle that should be included are not included.

Figure 5:
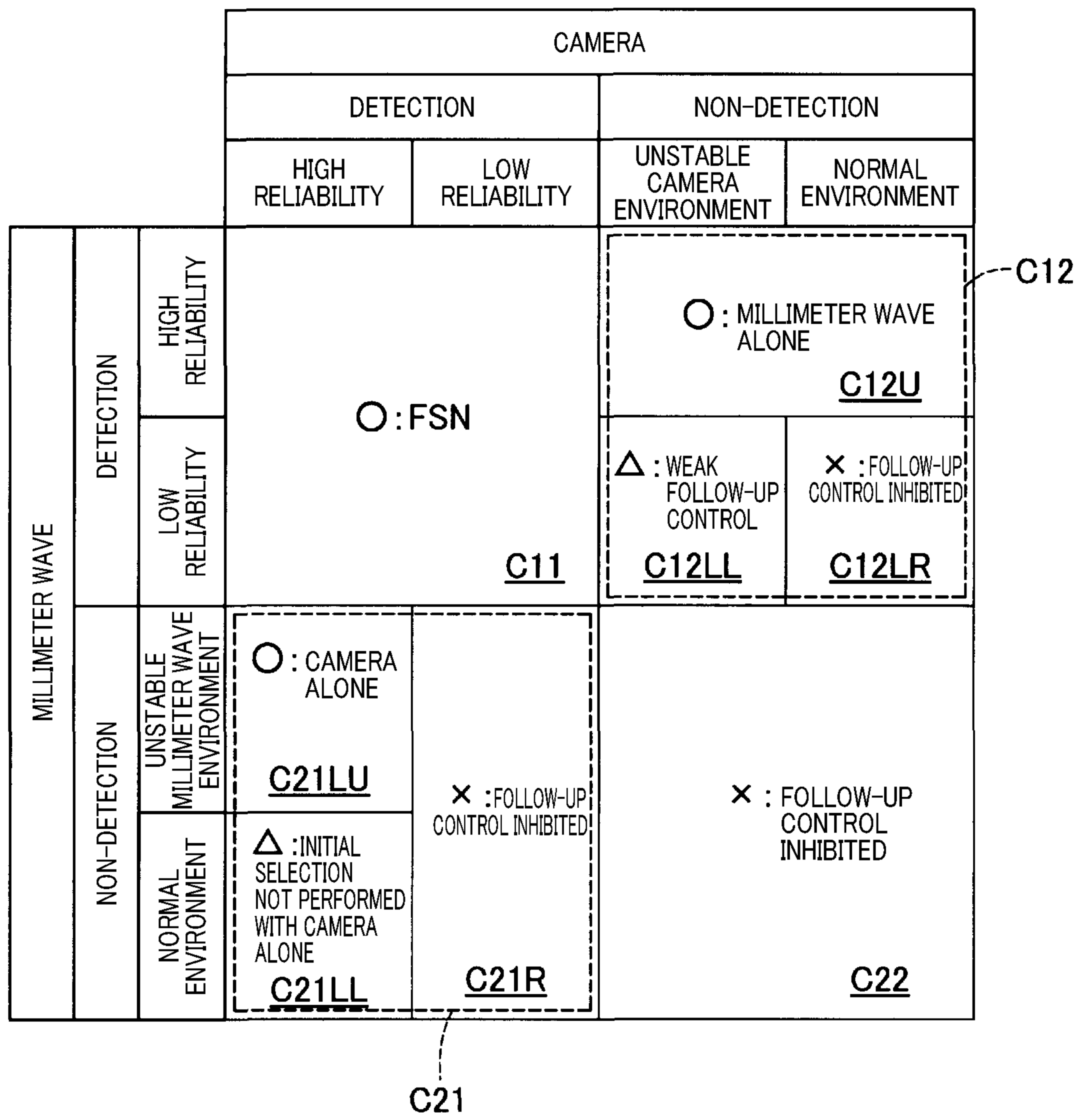
FIG. 5 is a table showing a specific embodiment of inter-vehicle distance control.

It should be noted that the distance threshold value Thph used for determining a candidate preceding vehicle to be followed, under the condition of C21LU in FIG. 5, is made higher than when the same processing is executed in the normal inter-vehicle distance control (S210 of FIG. 6), under the condition of C11 in FIG. 5. As a result, when the normal inter-vehicle distance control is performed under the condition of C21LU in FIG. 5, the preceding vehicle to be followed is determined from within a wider range of preceding vehicles than when the normal inter-vehicle distance control is performed under the condition of C11 in FIG. 5. By performing such processing, unnatural motion due to erroneous detection etc., can be prevented, when executing inter-vehicle distance control based on the output of the front camera 221 instead of the output of the millimeter wave radar 211.

The control device 100 selects the preceding vehicle having the smallest lower edge distance Dpv1 as the preceding vehicle to be followed (see the center of FIG. 4), from among the candidates for the preceding vehicle to be followed.

The lower edge distance Dpv1 is not affected by the actual size of the preceding vehicle in the horizontal direction. Hence when the lower edge distance Dpv1 is used, it is possible to accurately determine the relative magnitude relationships of the distance between the vehicle 500 and each preceding vehicle. Thus by executing the above processing, it is possible to appropriately determine the preceding vehicle having the smallest distance from the vehicle 500, from among a plurality of preceding vehicles that have been narrowed down beforehand.

It should be noted that the lower edge distance is affected by a difference between the pitch-direction orientation of the preceding vehicle and the pitch-direction orientation of the vehicle 500. However, when determining the object having the shortest distance to the vehicle 500 from among a plurality of preceding vehicles that have been narrowed down beforehand, it is only necessary for the relative magnitude relationships of the distances between the vehicle 500 and each preceding vehicle to be known. The pitch-direction orientation of the vehicle 500 and the pitch-direction orientation of preceding vehicles which are relatively close to the vehicle 500 do not differ greatly. Hence when the preceding vehicle having the shortest distance to the vehicle 500 is determined based on the lower edge distance Dpv1, there is a small possibility of that determination being in error.

With the above processing, it is made highly possible that the object to be followed by the vehicle in the inter-vehicle distance control can be correctly determined based on the images from the front camera 221 (see the center of FIG. 4).

The control device 100 then calculates the target acceleration, and executes the inter-vehicle distance control such that the width distance Dpvw from the preceding vehicle to be followed is held within a predetermined range (see the right side of FIG. 4). By performing such processing, the acceleration or deceleration of the vehicle 500 is made less likely to be affected by a difference between the pitch-direction orientation of the vehicle 500 and the pitch-direction orientation of the preceding vehicle which is at the smallest distance from the vehicle 500.

A6. Determination of Target Acceleration

The following two patterns of inter-vehicle distance control differ in the method of determining the target acceleration.

(a1) When the judgement result of step S110 of FIG. 6 is Yes and the process of step S210 is executed (see C11 of FIG. 5), and (a2) when the judgement result of step S120 is Yes and the processing of S210 and S220 is executed (see C12U and C12LL in FIG. 5).

(b1) When the judgement result of step S170 is Yes and the processing of step S210 is executed (see C21LU in FIG. 5), and (b2) when the judgement result of step S180 is No and the processing of step S210 is executed (see C21LL in FIG. 5).

That is, the method of determining the target acceleration differs between the case (a) in which a preceding vehicle is detected in front of the vehicle 500 based on the output of the millimeter wave radar 211 and the inter-vehicle distance control is performed, and the case (b) in which the preceding vehicle is not detected in front of the vehicle 500 based on the output of the millimeter wave radar 211 and the inter-vehicle distance control is performed. The inter-vehicle distance control performed in each case will be described in the following.

(1) When a Preceding Vehicle is Detected Based on the Output of the Millimeter Wave Radar 211:

The inter-vehicle distance control performed when a preceding vehicle is detected in front of the vehicle 500 based on the output of the millimeter wave radar 211 will be described referring to FIG. 12. The radar ECU 21 can determine the distance from the vehicle 500 of a preceding vehicle that is to be followed (see FIG. 7), and the relative speed of that preceding vehicle with respect to the vehicle 500, based on the output of the millimeter wave radar 211. The control device 100 maintains the vehicle 500 at a constant distance from the preceding vehicle that is to be followed, in other words, a required acceleration Gd is determined such that the deviation between the distance of the vehicle 500 from the preceding vehicle that is to be followed and a predetermined target distance becomes zero. (see the upper part of FIG. 12). The control device 100 determines a required acceleration Gvr such that the speed of the preceding vehicle to be followed becomes zero, relative to the vehicle 500 (see the lower part of FIG. 12).

The control device 100 determines a required acceleration G as the target acceleration based on the sum of the required acceleration Gd and the required acceleration Gvr. The required acceleration G is transmitted to the throttle valve drive device 31 and to the braking support device 32 as the target acceleration (see also the right side of FIG. 4). The throttle valve drive device 31 controls the air intake rate of the internal combustion engine ICE based on the information received on the target acceleration. The braking support device 32 controls the hydraulic pressure in the brake line 503 based on the information received on the target acceleration.

By performing such processing, when a preceding vehicle is detected in front of the vehicle 500 based on the output of the millimeter wave radar 211 (see C11 and C12 in FIG. 5), the millimeter-wave radar 211, which can determine distance more accurately than the front camera 221, is used in the inter-vehicle distance control, thereby enabling more accurate execution of control for making the relative speed between the vehicle 500 and the preceding vehicle become zero.

Figure 13:
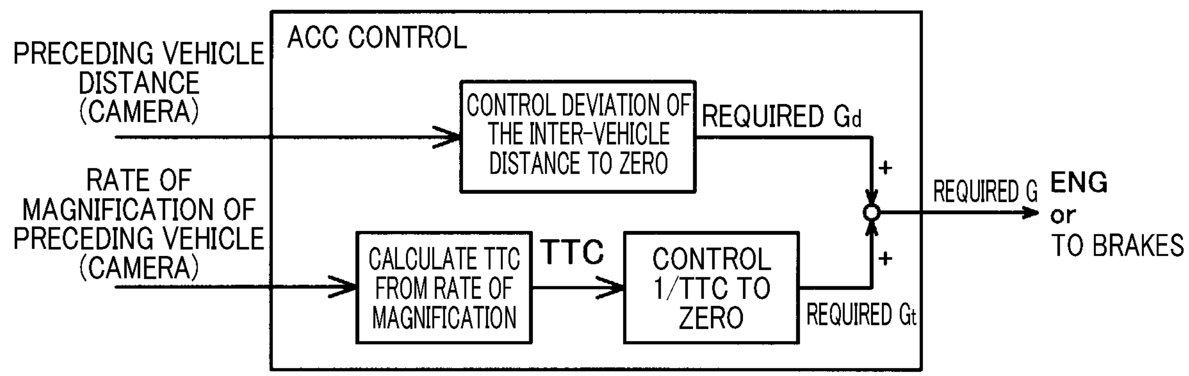
FIG. 13 is a block diagram showing the contents of inter-vehicle distance control performed when the preceding vehicle in front of the vehicle 500 is not detected based on the output of the millimeter wave radar 211.

(2) When the Preceding Vehicle is not Detected Based on the Output of the Millimeter Wave Radar 211:

The inter-vehicle distance control performed when a preceding vehicle is not detected in front of the vehicle 500 based on the output of the millimeter wave radar 211 will be described referring to FIG. 13. The camera ECU 22 can obtain the width distance Dpvw, between the vehicle 500 and the preceding vehicle that is to be followed, based on the output of the front camera 221 (see FIG. 10). The control device 100 determines a required acceleration Gd such to make the width distance Dpvw between the vehicle 500 and the preceding vehicle that is to be followed become constant, in other words, to make the deviation of the width distance Dpvw from a predetermined target distance become zero (see the upper part of FIG. 13).

The control device 100 determines a required acceleration Gt such that 1/TTC (Time To Collision) becomes zero. "TTC" is an index that represents the number of seconds after which a collision will occur, if the current value of relative speed is maintained. The processing executed by the control device 100 is described in greater detail hereinafter.

Figure 14:
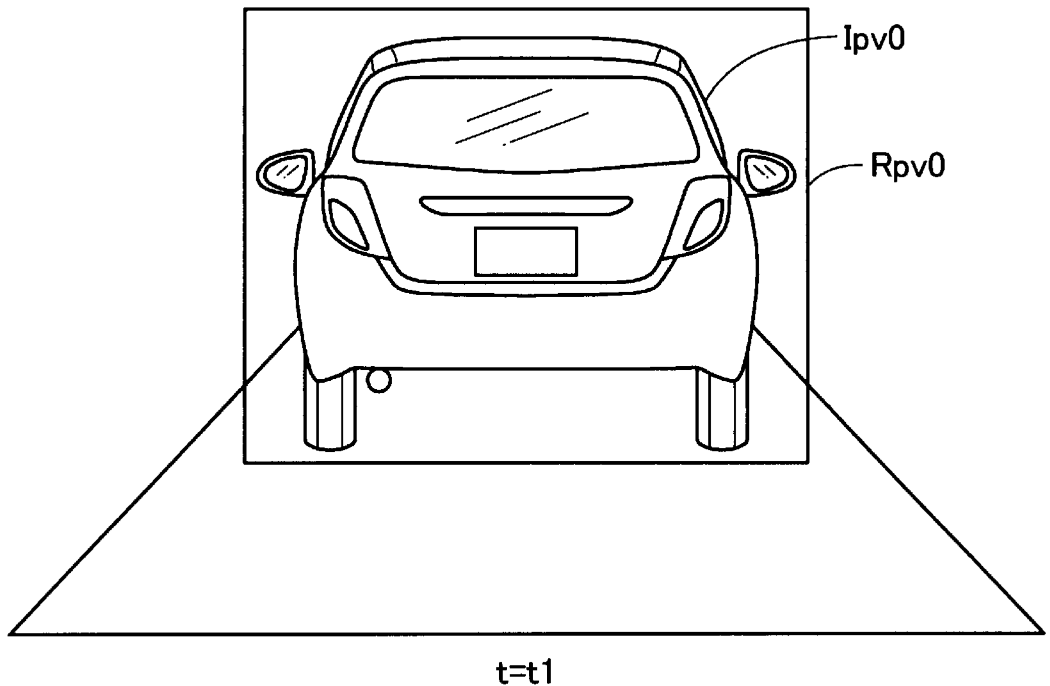
FIG. 14 is a diagram showing a rectangular region Rpv0 surrounding an image Ipv0 of a preceding vehicle at a time t1.
Figure 15:
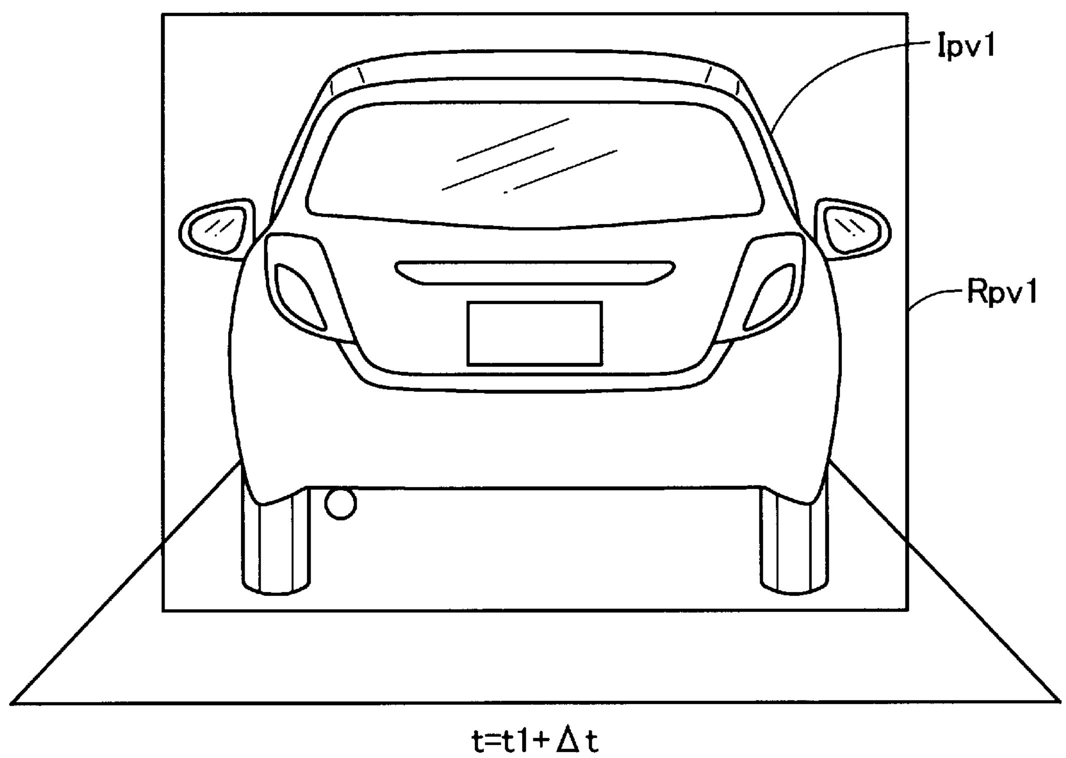
FIG. 15 is a diagram showing a rectangular region Rpv1 surrounding an image Ipv1 of the preceding vehicle, at a time t of t1+$\Delta$t.

As shown in FIG. 14, the control device 100 determines a rectangular region Rpv0 surrounding the image Ipv0 of the preceding vehicle when the time t is t1. Furthermore as shown in FIG. 15, the control device 100 determines a rectangular region Rpv1 surrounding the image Ipv1 of the preceding vehicle when the time t is t1+Δt. The TTC is then calculated from the enlargement ratio of the rectangular area Rpv1 with respect to the rectangular area Rpv0 and from the elapsed time Δt (see the lower left part of FIG. 13):

$$TTC=\Delta t/(\text{enlargement ratio}-1).$$

The control device 100 then determines the required acceleration Gt such as to bring 1/TTC to zero.

The control device 100 determines the required acceleration G as a target value of acceleration based on the sum of the required acceleration Gd and the required acceleration Gt. The required acceleration G is transmitted to the throttle valve drive device 31 and the braking support device 32 as the target acceleration (see also the right side of FIG. 4).

By performing such processing when a preceding vehicle is not detected in front of the vehicle 500 based on the output of the millimeter wave radar 211 (see the lower left of FIG. 13), the front camera 221 is used in the inter-vehicle distance control, enabling safe control to be executed for preventing collision with a preceding vehicle in front of the vehicle 500.

A7. Setting Upper Limits of the Target Acceleration and of the Target Speed

In the following four patterns of inter-vehicle distance control, an upper limit of the target acceleration and an upper limit of the target speed are set respectively independently. That is, in the following four patterns of inter-vehicle distance control, the control device 100 sets the upper limit parameter for the target acceleration, and the upper limit parameter for the target speed, respectively independently:

(a1) When the judgement result of step S110 of FIG. 6 is Yes and the process of step S210 is executed (see C11 in FIG. 5).

(a2) When the judgement result of step S130 is Yes and the process of step S210 is executed (see C12U in FIG. 5).

(b1) When the judgement result of step S170 is Yes and the process of step S210 is executed (see C21LU in FIG. 5).

(b2) When the judgement result of step S180 is No and the process of step S210 is executed (see C21LL in FIG. 5).

(c) When the process of step S220 is executed (see C12LL in FIG. 5).

In each of the cases shown in FIG. 5, the reliability of the result of detecting the presence or absence of a preceding vehicle based on the outputs of the sensors, and the reliability of the distance between the preceding vehicle and the vehicle 500, are respectively different. Hence by setting the upper limit parameters independently of each other, the parameters are set such that the motion of the vehicle 500 becomes slow during a condition of low reliability, to prevent unnatural motion due to erroneous detection, etc. However during a condition of high reliability, the parameters can be set such as to perform appropriate control in accordance with a proceding vehicle in front of the vehicle 500.

With the present embodiment, in the inter-vehicle distance control (weak follow-up control) executed in the case of C12LL in FIG. 5, the upper limit that is set for the target speed is lower than in the inter-vehicle distance control executed in the case of C11, C12U, C21LU and C21LL. Furthermore in the inter-vehicle distance control (weak follow-up control) executed in the case of C12LL in FIG. 5, the positive upper limit that is set with for the target acceleration is lower, and the negative upper limit that is set for the target acceleration is higher, than in the inter-vehicle distance control executed in the case of C11, C12U, C21LU and C21LL. As a result, the inter-vehicle distance control in the case of C12LL in FIG. 5 is executed such that the motion of the vehicle becomes slower than in the inter-vehicle distance control executed in the case of C11, C12U, C21LU and C21LL. It should be noted that the condition whereby the positive upper limit value of the target acceleration is low and the condition whereby the negative lower limit value of the target acceleration is high with respect to the comparison target are collectively referred to as "the upper limit value of the target acceleration is low" in this specification.

By performing such processing, the inter-vehicle distance control can be continued while ensuring safety, even when the detection of the preceding vehicle by one of the millimeter wave radar 211 and the front camera 221 (here, the millimeter wave radar 211) is erroneous, and when the distance to the object, as obtained based on the output of that sensor, contains a large error by comparison with the case in which the distance is obtained based on the outputs of both sensors. For example, when performing the inter-vehicle distance control based exclusively on the output of the millimeter wave radar 211 and not on the output of the front camera 221 (see C12LL in FIG. 5), unnatural motion due to erroneous detection or the like can be prevented.

Furthermore the upper limit parameter that is set for the target acceleration, in the inter-vehicle distance control executed in the case of C21LU and C21LL in FIG. 5, is set at a value which is between that of the inter-vehicle distance control of C11 and C12U and the inter-vehicle distance control of C12LL.

B. Other Embodiments

B1. Other Embodiments 1

(1) In the above embodiment, a millimeter wave radar 211 is employed as the first type of sensor (see FIG. 1). However, it would be equally possible to use various forms of sensor as the first type of sensor, such as a sensor using a LIDER (Laser Imaging Detection and Ranging) or a sonar, in addition to the millimeter wave radar. However it is preferable to employ a sensor that detects reflected waves, as the first type of sensor.

Furthermore, a single millimeter wave radar 211 disposed at the center of the front bumper 520 is used as the first type of sensor in the above embodiment (see FIG. 1). However it would be equally possible for two or more sensors installed at respectively different locations to be used as the first type of sensor.

(2) In the above embodiment, a single front camera 221 disposed at the center of the upper part of the windshield 510 is adopted as the second type of sensor (see FIG. 1). However it would be equally possible for other configurations, such as two or more cameras installed in respectively different locations, to be used as the second type of sensor. However it is preferable to adopt a sensor that can acquire external images as the second type of sensor.

(3) In the above embodiment, the internal combustion engine ICE serving as a prime mover is a gasoline engine, and the throttle valve drive device 31 that controls the output of the prime mover increases or decreases the rate of air intake of the internal combustion engine ICE (see FIG. 1). However it would be equally possible for other configurations to be used for the prime mover and the output adjusting mechanism. For example, if a diesel engine with a constant intake air rate is used as a prime mover, a fuel injector drive device that controls the amounts of fuel injected by the fuel injectors may be used as the output adjustment mechanism.

(4) In the above embodiment, a braking support device 32 is provided on the brake lines 503, and increases or decreases the hydraulic pressure in the brake lines 503 in accordance with a control signal from the control device 100 (see FIG. 1). However other configurations may be adopted for the mechanism that controls the deceleration (negative acceleration) of the vehicle. For example it is possible to provide a braking support device and a braking device on each of respective wheels, with each braking device connected to a braking support device by a control signal line, and with the braking support device controlling an actuator provided in the braking device via the control signal line.

(5) The CPU 101 constituting the control device 100 may be a single CPU or a plurality of CPUs. Furthermore the CPU 101 constituting the control device 100 may be a single CPU, that is a multi-thread type of CPU, which is capable of executing a plurality of programs concurrently.

(6) In the above embodiment, the radar ECU 21 generates a detection signal representing an object based on reflected waves that are acquired by the millimeter wave radar 211, and outputs the detection signal to the control device 100 (see FIGS. 1 and 4). However it would be equally possible for the radar ECU 21 to be omitted, and for the signal expressing the unprocessed received waves to be inputted to the control device 100 from the millimeter wave radar 211 as the first detection signal.

In the above embodiment, the camera ECU 22 uses an image acquired by the front camera 221 and the shape pattern of an object prepared beforehand, to generate a detection signal expressing the object by the image, and outputs the detection signal to the control device 100 (see FIGS. 1 and 4). However it would be equally possible for the camera ECU 22 to be omitted, and for the unprocessed image data captured by the front camera 221 to be inputted to the control device 100 as the second detection signal. In such a mode, the control device 100 would recognize an object by using the outer shape pattern of the object.

(7) In the above embodiment, when the millimeter wave radar 211 is not in an unstable environment, in which the output of the millimeter wave radar 211 is low in reliability (S170: No in FIG. 6), a decision is made in step S180 as to whether the current judgement "preceding vehicle is present" is an initial selection, and a decision is then made as to whether normal follow-up travel control (S210) or constant speed travel control (S230) is to be performed. However it would be equally possible to use a mode in which the normal follow-up travel control (S210) or the constant speed travel control (S230) is performed without performing step S180.

(8) In the above embodiment, in step S140 of FIG. 6, the control device 100 judges whether the camera instability condition is satisfied, and the travel control to be executed is changed in accordance with the judgement result (see S220 and S230 in FIG. 6). Furthermore in step S170, the control device 100 judges whether the environment of the millimeter wave radar 211 satisfies the radar instability condition, and the travel control to be executed is changed in accordance with the judgement result (see S210, S230). That is, the fact that the second condition is satisfied is equivalent to the fact that the first condition is not satisfied, where the second condition indicates a lower reliability of the output from the non-detecting sensor than does the first condition.

However it would be equally possible to establish the second condition, which indicates low reliability of the output of the non-detecting sensor, by adding a further condition to "first condition not satisfied". Furthermore the second condition may be defined based on a parameter which is different from a parameter defining the first condition.

(9) In the above embodiment, when a preceding vehicle is detected in front of the vehicle 500 based on the output of the millimeter wave radar 211 and is not detected based on the output of the front camera 221 (YES in S120 of FIG. 6, C12 in FIG. 5), while in addition the environment of the front camera 221 satisfies the second condition, indicating that the reliability of the output of the front camera 221 is low (S140: Yes), then the control device 100 performs the inter-vehicle distance control (S220, C12LL) under a predetermined condition (S130: No) based on the output of the millimeter wave radar 211, which is a sensor based on whose output the preceding vehicle is detected.

If a preceding vehicle is detected in front of the vehicle 500 based on the output of the millimeter wave radar 211, and the preceding vehicle is not detected based on the output of the front camera 221 (S120 of FIG. 6, Yes, FIG. 5 C12), while in addition the environment of the front camera 221, which is a sensor based on whose output the preceding vehicle is not detected, satisfies a first condition indicating that the output of the front camera 221 is not reliable (S140: No), under the predetermined condition (S130: No), the control device 100 does not perform the inter-vehicle distance control (S230, C12LR).

However it would be equally possible to use, as the "predetermined condition" to be satisfied in the above case, a condition other than the state of reliability of the output of the detecting sensor (S130: No). Moreover it would be equally possible to use another condition, such as the setting of a predetermined operation mode, as the "predetermined condition" to be satisfied in the above case, in addition to the reliability condition of the output of the detecting sensor. Furthermore a condition that is always satisfied may be set as the "predetermined condition". Moreover the "predetermined condition" that should be satisfied for performing the inter-vehicle distance control (S220, C12LL) and the "predetermined condition" that should be satisfied for not performing the inter-vehicle distance control (S230, C12LR) may be made respectively different.

In the above embodiment, when a preceding vehicle is detected in front of the vehicle 500 based on the output of the front camera 221 and the preceding vehicle is not detected based on the output of the millimeter wave radar 211 (S150: Yes, C21), while in addition the environment of the millimeter wave radar 211 satisfies the second condition regarding the reliability of the output of the millimeter wave radar 211, indicating that the reliability of the output of the millimeter wave radar 211 is lower than that of the first condition (S170: Yes), then the control device 100 performs the inter-vehicle distance control (S210, C21LU) under a predetermined condition (S160: Yes), based on the output of the front camera 221, which is a sensor based on whose output the preceding vehicle is detected.

However it would be equally possible to set another condition as the "predetermined condition" to be satisfied in the above case, instead of the reliability of the output of the detecting sensor (S160: Yes). Moreover it would be equally possible to also set another condition such as setting a predetermined travel mode as a "predetermined condition" to be satisfied in the above case, in addition to the reliability of the output of the detecting sensor (S160: YES). Furthermore a condition that is always satisfied may be set as the "predetermined condition" to be satisfied.

In the above embodiment, when a preceding vehicle is detected in front of the vehicle 500 based on the output of the front camera 221, and is not detected based on the output of the millimeter wave radar 211 (S150: Yes, C21), while in addition the environment of the millimeter wave radar 211, which is a sensor based on whose output the preceding vehicle is not detected, satisfies the first condition, indicating that the reliability of the output of the millimeter wave radar 211 is not low (S170: No) the control device 100 does not perform the inter-vehicle distance control (S230, C21LL) under the predetermined condition (S160: Yes, S180: Yes).

However, it would be equally possible for another condition to instead be made the "predetermined condition" (S160: Yes, S180: Yes) to be satisfied in the above case. Furthermore another condition may be added as a "predetermined condition" to be satisfied in the above case (S160: Yes, S180: Yes), such as a predetermined operation mode. Furthermore a condition that is always satisfied may be set as a "predetermined condition".

B2. Other Embodiments 2

In the above embodiment, in the weak inter-vehicle distance control (see C12LL in FIG. 5, S220 in FIG. 6), the upper limit of speed and the upper limit of acceleration are set lower than in the case in which both the millimeter wave radar 211 and the front camera 221 recognize the preceding vehicle (C11 in FIG. 5, S110 and S210 in FIG. 6). However, it would be equally possible for only one of the upper limit of speed and the upper limit of acceleration to be set low, or for both the upper limit of speed and the upper limit of acceleration to be set at the same values as in the case in which the preceding vehicle is recognized by both the millimeter wave radar 211 and the front camera 221 (see C11 in FIGS. 5, S110 and S210 in FIG. 6). This is also true for the inter-vehicle distance control executed in the case of C21LU in FIG. 5.

B3. Other Embodiments 3

In the above embodiment, in the inter-vehicle distance control of C11, C12U, C12LL, C21LU, C21LL in FIG. 5, the parameters that define the motion of the vehicle are set respectively independently. However it would be equally possible for the parameters that define the motion of the vehicle to be shared, in all or part of the inter-vehicle distance control of C11, C12U, C12LL, C21LU, and C21LL in FIG. 5.

B4. Other Embodiments 4

In the above embodiment, the judgements in steps S130, S140, S160 and S170 are made based on the output of the millimeter wave radar 211 or of the front camera 221, used in the inter-vehicle distance control (see FIGS. 7 and 8). However, it would be equally possible to for the reliability of each sensor to be judged based not only on the outputs of both of the sensors used in the inter-vehicle distance control, but also on the outputs of devices other than the sensors used in the inter-vehicle distance control. Furthermore the judgements made in steps S130, S140, S160, and S170 may be performed based on both the outputs from the sensors used in the inter-vehicle distance control and the outputs from other devices.

For example it would be equally possible to judge whether the vehicle is in an environment such as in a tunnel, next to a sound barrier or under an elevated road, based on map information and the output of a device such as GPS that can identify the current position of the vehicle, and to judge that the radar instability condition is satisfied when the vehicle is in such an environment. Furthermore it can be judged that the camera instability condition is satisfied when there is rainfall or snow at the current position, based on the output of a device that can specify the current position of the vehicle, and on weather information which is obtained externally, based on the output from that device.

B5. Other Embodiments 5

In the above embodiment, in the inter-vehicle distance control of C21LU and C21LL in FIG. 5, the width distance Dpvw is used to determine the candidates for the preceding vehicle to be followed, and the lower edge distance Dpv1 is used to decide the preceding vehicle that is to be followed, from among these candidates. However it would be equally possible for the lower edge distance Dpv1 to be used for determining the candidates for the preceding vehicle to be followed. Furthermore it would be equally possible for the width distance Dpvw to be used in deciding the preceding vehicle that is to be followed. Furthermore the output of a device other than the camera as the detecting sensor and the non-detection sensor may be used to determine the candidates for the preceding vehicle to be followed, and in deciding the preceding vehicle that is to be followed.

B6. Other Embodiments 6

Figure 12:
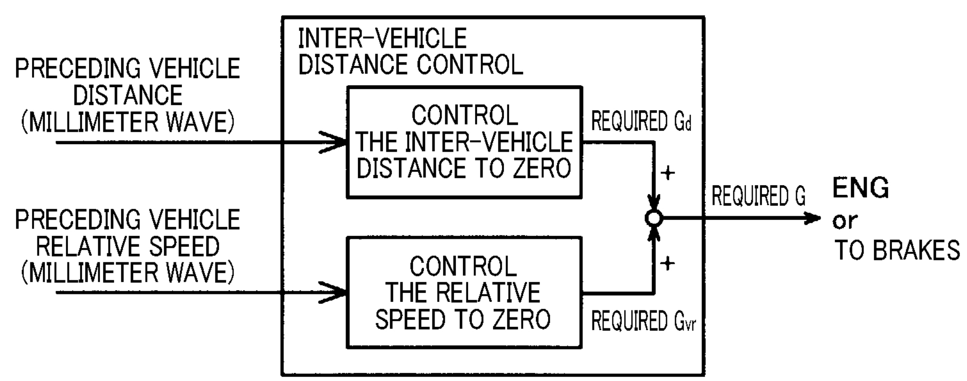
FIG. 12 is a block diagram showing the contents of inter-vehicle distance control performed when a preceding vehicle in front of the vehicle 500 is detected based on the output of the millimeter wave radar 211.

(1) In the above embodiment, when a preceding vehicle is detected based on the output of the millimeter wave radar 211, the required acceleration Gvr, which is one factor of the required acceleration, is set such that the speed of the preceding vehicle to be followed becomes zero relative to the vehicle 500 (see the lower part of FIG. 12). However, even when the preceding vehicle is detected based on the output of the millimeter wave radar 211, one of the factors of the required acceleration may be determined such that 1/TTC becomes zero.

(2) In the above embodiment, when the preceding vehicle is not detected based on the output of the millimeter wave radar 211, the required acceleration Gt is determined as one of the factors of the required acceleration, such that 1/TTC becomes zero. However, even when the preceding vehicle is not detected based on the output of the millimeter wave radar 211, one of the factors of the required acceleration may be determined such that the speed of the preceding vehicle to be followed becomes zero relative to the vehicle 500.

B7. Other Embodiments 7

(1) In the above embodiment, in the inter-vehicle distance control of C12LL, C21LU, C21LL of FIG. 6 performed based on the output of the front camera 221, the parameters defining the motion of the vehicle 500 are set such that the motion of the vehicle 500 is slower than in the case of the inter-vehicle distance control of C11, C12U. However during the normal inter-vehicle distance control that is performed under the conditions of C12LL, C21LU, C21LL also, the parameters that define the motion of the vehicle may be set identically to those in the case in which the normal inter-vehicle distance control is performed under the condition of C11.

(2) In the above embodiment, concerning the threshold parameters used for determining the preceding vehicle that is to be the object of controlling the vehicle 500 in the inter-vehicle distance control of C12LL, C21LU, C21LL of FIG. 6 such as to keep the distance of that preceding vehicle from the vehicle 500 within a predetermined range, the threshold parameters are set such that the preceding vehicle is determined from among a wider range of objects than is the case with the inter-vehicle distance control of C11, C12U. However it would be equally possible to determine the preceding vehicle to be followed, during the normal inter-vehicle distance control performed under the conditions of C12LL, C21LU, C21LL, in the same way as with the normal inter-vehicle distance control that is performed under the condition of C11.

Furthermore it is possible to set the judgement threshold value such as to render it difficult for an object to be excluded from the candidates, if that object has already been set, at least once, as the preceding vehicle to be followed or as a candidate for the preceding vehicle to be followed, and to set the judgement threshold value such as to make it difficult for an object to be set as a candidate for the preceding vehicle to be followed if that object has not already been set as the preceding vehicle to be followed or as a candidate. If such an aspect is adopted, it becomes possible to more reliably determine a candidate for the preceding vehicle to be followed, by making use of judgement results that were obtained previously, when in an environment where the sensor(s) had high reliability.

B8. Other Embodiments 8

The above embodiments can be respectively understood from the following aspects.

(1) A driving assist device (10) includes: a first sensor (211); a second sensor (221), the first and second sensors being used for detection of an object (Vp) in front of the driving assist device; and a control device (100) for executing inter-vehicle distance control using an output of the first sensor (211) or an output of the second sensor (221) to keep an inter-vehicle distance within a predetermined range, the inter-vehicle distance being a distance between a vehicle (500) and at least one preceding object (Vp) in front of the vehicle (500).

The control device (100) is configured not to execute the inter-vehicle distance control under a predetermined first condition (S230, C12LR, C21LL) upon determination that the at least one preceding object (Vp) is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device (100) is configured to execute the inter-vehicle distance control under a predetermined second condition (S220, S210, C12LL, C21LU) upon determination that the environment of the non-detection sensor satisfies a second requirement for determination of the reliability of the output of the non-detection sensor, each of the first and second conditions representing that a corresponding level of the reliability of the output of the non-detection sensor, the level of the reliability of the output of the non-detection sensor represented by the second condition being lower than the level of the reliability of the output of the non-detection sensor represented by the first condition.

From such an aspect, even when an object is not detected based on the output of one of the sensors, if that sensor is in an environment in which the output from the sensor has low reliability, then the inter-vehicle distance control is performed, under a predetermined condition, based on the output of the other sensor. For that reason the inter-vehicle distance control is more likely to be performed continuously, than with a mode in which the inter-vehicle distance control is always prohibited when an object is not detected based on the output of one of the sensors.

(2) The driving assist device (10) wherein, the control device (100) is configured to perform at least one of a first process (S220) and a second process (S220) upon determination that a first case is present, the first case representing that the at least one preceding object (Vp) is detected based on the output of one of the first sensor and the second sensor without being detected based on the output of the other of the first and second sensors, the first process being configured to reduce an upper limit of an acceleration of the vehicle (500) used by the inter-vehicle control for the first case to be lower than that for a second case, the second case representing that the at least one preceding object (Vp) is detected based on the output of each of the first and second sensors, the second process being configured to reduce an upper limit of a speed of the vehicle (500) used by the inter-vehicle control for the first case to be lower than that for the second case.

Even in a case in which the detection of an object by one of the sensors is erroneous, and in which the distance to an object, as determined based on the output of that sensor, is greatly in error by comparison with the distance to the object as determined based on the outputs of both of the sensors, the inter-vehicle distance control can be continued while ensuring that safety is maintained.

(3) The driving assist device, wherein: the control device (100) is configured to individually set a parameter defining a motion of the vehicle (500) in the inter-vehicle distance control (S220, S210, C12U, C12LL, C21LU, C21LL, C11) for each of first to third detection cases, the first detection case representing that the at least one preceding object (Vp) is detected based on the output of the first sensor without being detected based on the output of the second sensor, the second detection case representing that the at least one preceding object (Vp) is detected based on the output of the second sensor without being detected based on the output of the first sensor, the third detection case that is the second case representing that the at least one preceding object (Vp) is detected based on the output of each of the first and second sensors.

The reliability of the detection results concerning the presence or absence of an object, and the reliability of the distance between the object and the vehicle, as determined based on the outputs of the sensors, may be different among the above three cases. For this reason, the parameters can be set such that when the reliability is low in the above type of mode, the motion of the vehicle becomes slow, thereby enabling unnatural motion due to erroneous detection or the like to be prevented, and the parameters can be set such that when the reliability is high, suitable control is executed in accordance with an object in front of the vehicle.

(4) The driving assist device (10), in which the first sensor (211) is a millimeter wave radar (211); the second sensor (221) is a camera (221); and the control device (100) is configured to determine (S170) whether the environment of the non-detection sensor satisfies the second requirement in accordance with at least one of the output of the millimeter wave radar (211) and the output of the camera (221) upon determination that the at least one preceding object (Vp) is detected based on the output of the camera (221) without being detected based on the output of the millimeter wave radar (211).

According to such an aspect, when the non-detecting sensor is the millimeter wave radar, a judgement is made as to whether the millimeter wave radar is in an environment in which it has low reliability, with the judgement being based on the outputs of two types of sensor that serve to detect objects located ahead.

(5) The driving assist device (10), wherein, the at least one preceding object (Vp) includes a plurality of preceding objects (Vp); the control device (100) is configured to execute the inter-vehicle distance control that includes first to fourth processes upon determination that: each of the preceding objects (Vp) is detected based on the output of the camera (221) without being detected based on the output of the millimeter wave radar (211); and the environment of the millimeter wave radar satisfies the second requirement, the first process being to determine, in accordance with an angular range (Apv) occupied by each preceding object (Vp) in a horizontal direction, an azimuth angle (Ad) of the corresponding preceding object (Vp) with respect to a forward direction (Dv0) of the vehicle (500), and a width distance (Dpvw) between the vehicle (500) and the corresponding preceding object (Vp), the second process being to calculate a deviation (ΔPh) of each receding object (Vp) from the vehicle (500) in a forward direction (DvO) of the vehicle (500), based on the azimuth angle (Ad) and on the width distance (Dpvw) of the corresponding preceding object (Vp), the third process being to use the output of the camera (221) to determine a lower edge distance between the vehicle (500) and each preceding object (Vp) in accordance with a height (Vpb) from a lower edge of the corresponding preceding object (Vp) to a vanishing point (FOE), the fourth process being to adjust, upon determination that the deviations of one or more preceding objects in the plurality of preceding objects being lower than or equal to a predetermined threshold, the width distance (Dpvw) between a shortest preceding object (Vp) and the vehicle (500) to be within a predetermined range, the shortest preceding object having a shortest value of the deviation from the vehicle (500) in the forward direction of the vehicle (500) in the plurality of preceding objects.

In the above aspect, an object whose amount of deviation from the travel direction of the own vehicle is less than a threshold value is determined based on the width distance. Since the width distance is determined based on the angular range occupied by a preceding object in the horizontal direction, it is not affected by a difference between the pitch-direction orientation of the preceding object and the pitch-direction orientation of the own vehicle. Hence even if there are variations in the inclination of the road, it is possible to appropriately determine an object whose amount of deviation from the travel direction of the own vehicle is equal to or less than the threshold value.

It should be noted that since the width distance is determined based on the angular range occupied by a preceding object in the horizontal direction, it is affected by the actual size of the preceding object in the horizontal direction. However, in the case of a vehicle that is manufactured in accordance with the regulations and which travels on a road carrying a person, the actual size in the horizontal direction is also within a predetermined range. Hence, even if the objects are restricted to those for which the amount of deviation from the travel direction of the own vehicle is equal to less than the threshold value, it is unlikely that objects which should be included will be omitted.

On the other hand since the lower edge distance is determined based on the height from the lower edge of the preceding object to the vanishing point, it is not affected by the actual size of a preceding object in the horizontal direction. Hence when the lower edge distance is used, it is possible to accurately determine the magnitude relationships of the distances between the own vehicle and each of respective objects. Thus according to the above aspect, it is possible to appropriately determine the object having the smallest distance from among a plurality of objects that have been narrowed down beforehand.

It should be noted that, since the lower edge distance is determined based on the height from the lower edge of a preceding object to the vanishing point, it is influenced by a difference between the pitch-direction orientation of the preceding object and the pitch-direction orientation of the own vehicle. However, when determining the object having the smallest distance to the own vehicle from among a plurality of objects that have been narrowed down beforehand, it is sufficient to know the magnitude relationships of the distances between the own vehicle and each of respective objects. The pitch-direction orientations of a plurality of objects that are relatively close to the own vehicle and the pitch-direction orientation of the own vehicle will not be significantly different. Hence even when the object having the smallest distance to the own vehicle is determined based on the lower edge distance, it is unlikely that there will be an error in determining that object.

Hence according to the above aspect, it is very possible that the object to be followed in the inter-vehicle distance control can be correctly determined. Furthermore according the above aspect, the inter-vehicle distance control is performed based on the width distance between the own vehicle and the object having the smallest distance to the own vehicle. Thus, differences between the pitch-direction orientation of the object having the shortest distance from the own vehicle and the pitch-direction orientation of the own vehicle are unlikely to affect the acceleration or deceleration of the own vehicle.

(6) The driving assist device (10), wherein, the control device (100) is configured to perform, in the inter-vehicle distance control, a first control task and a second control task, the first control task being configured to set a relative speed between the vehicle (500) and the at least one preceding object (Vp) to zero, the relative speed being determined based on the output of the millimeter wave radar (211), the second control task being configured to cause a value 1/TTC to converge to zero, the value 1/TTC being calculated from a rate of magnification of an image of the at least one preceding object (Vp) per unit of time, the rate of magnification of the image being determined based the output of the camera (221); and the control device (100) is configured to: execute, in the inter-vehicle distance control, the first control task without executing the second control task upon determination that the at least one preceding object (Vp) is detected based on the output of the millimeter wave radar (211); and execute, in the inter-vehicle distance control, the second control task without performing the first control task upon determination that the at least one preceding object (Vp) is not detected based on the output of the millimeter wave radar (211).

In the above aspect, when an object in front of the vehicle is detected based on the output of the millimeter wave radar, control for zeroing the speed of the vehicle relative to the preceding object can be accurately performed during the inter-vehicle distance control by using the millimeter-wave radar, which can determine distance more accurately than the camera. On the other hand, when the object in front of the vehicle is not detected based on the output of the millimeter wave radar, the camera can be used in the inter-vehicle distance control, for executing safe control to prevent collision with a preceding object.

(7) The driving assist device (10), wherein the control device (100) is configured to execute the inter-vehicle distance control that includes first and second setting processes upon determination that: the preceding objects (Vp) is detected based on the output of the camera (221) without being detected based on the output of the millimeter wave radar (211); and the environment of the millimeter wave radar satisfies the second requirement, the first setting process being to set a parameter to thereby cause a motion of the vehicle (500) to be slower than the motion of the vehicle (500) executed when the preceding vehicle (Vp) is detected based on the output of the millimeter wave radar (211), the second setting process being to set a value of a threshold parameter to be different from a value of the threshold parameter used by the inter-vehicle distance control in a case where the preceding vehicle (Vp) is detected based on the output of the millimeter wave radar (211), the threshold parameter being used to determine the preceding vehicle as a target, the inter-vehicle distance control keeping a distance from the vehicle (500) to the target within the predetermined range.

With such a mode, it is possible to prevent unnatural motion due to erroneous detection, etc., when performing inter-vehicle distance control that is based on the output of the camera and is not based on the output of the millimeter wave radar.

(8) The driving assist device (10), wherein the first sensor (211) is a millimeter wave radar (211) and the second sensor (221) is a camera (221), and the control device (100) is configured to execute the inter-vehicle distance control that includes a setting process upon determination that: the preceding objects (Vp) is detected based on the output of the camera (221) without being detected based on the output of the millimeter wave radar (211); the environment of the camera (221) satisfies the second requirement; and the environment of the millimeter wave radar satisfies the second requirement, the setting process being to set a parameter to thereby cause a motion of the vehicle (500) to be slower than the motion of the vehicle (500) executed when the preceding vehicle (Vp) is detected based on the output of each of the millimeter wave radar (211) and the camera (221).

With such a mode, it is possible to prevent unnatural motion due to erroneous detection, etc, when performing inter-vehicle distance control that is based on the output of the millimeter wave radar and is not based on the output of the camera.

(9) The driving assist device (10), wherein: the first sensor (211) is a millimeter wave radar (211); the second sensor (221) is a camera (221); the second requirement of the first sensor (211) is set such as to be satisfied when the vehicle (500) is within a tunnel; and the control device (100) is configured to execute the inter-vehicle distance control in accordance with the output of the camera (221) upon determination that: the preceding objects (Vp) is detected based on the output of the camera (221) without being detected based on the output of the millimeter wave radar (211); and the environment of the camera (221) satisfies the second requirement.

With such a mode, even if an object is not detected based on the output of the millimeter wave radar, such as when the vehicle is in a tunnel, where the output of the millimeter wave radar is unreliable, the inter-vehicle distance control is performed based on the output of the camera. Hence the inter-vehicle distance control is more likely to be continuously performed than in the case of a mode in which the inter-vehicle distance control is always prohibited when an object is not detected based on the output of the millimeter wave radar.

(10) A driving assist method includes: (a) a first step in which a control device (100) obtains an output of a first sensor (211) for detecting an object (Vp) in front of the control device; (b) a second step in which the control device (100) obtains an output of a second sensor (221), for detecting an object (Vp) in front of the control device; and (c) a third step in which the control device (100) executes inter-vehicle distance control using the output of the first sensor (211) or the output of the second sensor (221) to keep an inter-vehicle distance within a predetermined range, the inter-vehicle distance being a distance between a vehicle (500) and at least one preceding object (Vp) in front of the vehicle (500); wherein the control device (100) fails to execute the inter-vehicle distance control under a predetermined first condition (S230, C12LR, C21LL) upon determination that the at least one preceding object (Vp) is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device (100) executes the inter-vehicle distance control under a predetermined second condition (S220, S210, C12LL, C21LU) upon determination that the environment of the non-detection sensor satisfies a second requirement for determination of the reliability of the output of the non-detection sensor, each of the first and second conditions representing that a corresponding level of the reliability of the output of the non-detection sensor, the level of the reliability of the output of the non-detection sensor represented by the second condition being lower than the level of the reliability of the output of the non-detection sensor represented by the first condition.

(11) The driving assist method wherein: in the third step (c), the control device (100) performs at least one of a first process (S220) and a second process (S220) upon determination that a first case is present, the first case representing that the at least one preceding object (Vp) is detected based on the output of one of the first sensor and the second sensor without being detected based on the output of the other of the first and second sensors, the first process is to reduce an upper limit of an acceleration of the vehicle (500) used by the inter-vehicle control for the first case to be lower than that for a second case, the second case represents that the at least one preceding object (Vp) is detected based on the output of each of the first and second sensors, the second process is to reduce an upper limit of a speed of the vehicle (500) used by the inter-vehicle control for the first case to be lower than that for the second case.

(12) The driving assist method wherein in the third step (c): the control device (100) individually sets a parameter defining a motion of the vehicle (500) in the inter-vehicle distance control (S220, S210, C12U, C12LL, C21LU, C21LL, C11) for each of first to third detection cases, the first detection case represents that the at least one preceding object (Vp) is detected based on the output of the first sensor without being detected based on the output of the second sensor, the second detection case represents that the at least one preceding object (Vp) is detected based on the output of the second sensor without being detected based on the output of the first sensor, the third detection case that is the second case representing that the at least one preceding object (Vp) is detected based on the output of each of the first and second sensors.

(13) The driving assist method wherein the first sensor (211) is a millimeter wave radar (211); the second sensor (221) is a camera (221); and in the third step (c), the control device (100) determines (S170) whether the environment of the non-detection sensor satisfies the second requirement in accordance with at least one of the output of the millimeter wave radar (211) and the output of the camera (221) upon determination that the at least one preceding object (Vp) is detected based on the output of the camera (221) without being detected based on the output of the millimeter wave radar (211).

(14) The driving assist method wherein the at least one preceding object (Vp) includes a plurality of preceding objects (Vp); in the third step (c), the control device (100) executes the inter-vehicle distance control that includes first to fourth processes upon determination that: each of the preceding objects (Vp) is detected based on the output of the camera (221) without being detected based on the output of the millimeter wave radar (211); and the environment of the millimeter wave radar satisfies the second requirement, the first process is to determine, in accordance with an angular range (Apv) occupied by each preceding object (Vp) in a horizontal direction, an azimuth angle (Ad) of the corresponding preceding object (Vp) with respect to a forward direction (DvO) of the vehicle (500), and a width distance (Dpvw) between the vehicle (500) and the corresponding preceding object (Vp), the second process is to calculate a deviation (ΔPh) of each receding object (Vp) from the vehicle (500) in a forward direction (DvO) of the vehicle (500), based on the azimuth angle (Ad) and on the width distance (Dpvw) of the corresponding preceding object (Vp), the third process is to use the output of the camera (221) to determine a lower edge distance between the vehicle (500) and each preceding object (Vp) in accordance with a height (Vpb) from a lower edge of the corresponding preceding object (Vp) to a vanishing point (FOE), the fourth process is to adjust, upon determination that the deviations of one or more preceding objects in the plurality of preceding objects being lower than or equal to a predetermined threshold, the width distance (Dpvw) between a shortest preceding object (Vp) and the vehicle (500) to be within a predetermined range, the shortest preceding object having a shortest value of the deviation from the vehicle (500) in the forward direction of the vehicle (500) in the plurality of preceding objects.

(15) The driving assist method wherein the control device (100) is to perform, in the inter-vehicle distance control, a first control task and a second control task, the first control task is to set a relative speed between the vehicle (500) and the at least one preceding object (Vp) to zero, the relative speed being determined based on the output of the millimeter wave radar (211), the second control task is to cause a value 1/TTC to converge to zero, the value 1/TTC is calculated from a rate of magnification of an image of the at least one preceding object (Vp) per unit of time, the rate of magnification of the image is determined based the output of the camera (221); and in the third step (c): the control device (100): executes, in the inter-vehicle distance control, the first control task without executing the second control task upon determination that the at least one preceding object (Vp) is detected based on the output of the millimeter wave radar (211); and executes, in the inter-vehicle distance control, the second control task without performing the first control task upon determination that the at least one preceding object (Vp) is not detected based on the output of the millimeter wave radar (211).

(16) The driving assist method wherein in the third step (c), the control device (100) executes the inter-vehicle distance control that includes first and second setting processes upon determination that: the preceding objects (Vp) is detected based on the output of the camera (221) without being detected based on the output of the millimeter wave radar (211); and the environment of the millimeter wave radar satisfies the second requirement, the first setting process is to set a parameter to thereby cause a motion of the vehicle (500) to be slower than the motion of the vehicle (500) executed when the preceding vehicle (Vp) is detected based on the output of the millimeter wave radar (211), the second setting process is to set a value of a threshold parameter to be different from a value of the threshold parameter used by the inter-vehicle distance control in a case where the preceding vehicle (Vp) is detected based on the output of the millimeter wave radar (211), the threshold parameter is used to determine the preceding vehicle as a target, the inter-vehicle distance control keeping a distance from the vehicle (500) to the target within the predetermined range.

(17) The driving assist method, wherein the first sensor (211) is a millimeter wave radar (211) and the second sensor (221) is a camera (221), and in the third step (c), the control device (100) executes the inter-vehicle distance control that includes a setting process upon determination that: the preceding objects (Vp) is detected based on the output of the camera (221) without being detected based on the output of the millimeter wave radar (211); the environment of the camera (221) satisfies the second requirement; and the environment of the millimeter wave radar satisfies the second requirement, the setting process is to set a parameter to thereby cause a motion of the vehicle (500) to be slower than the motion of the vehicle (500) executed when the preceding vehicle (Vp) is detected based on the output of each of the millimeter wave radar (211) and the camera (221).

(18) The driving assist method, wherein: the first sensor (211) is a millimeter wave radar (211); the second sensor (221) is a camera (221); the second requirement of the first sensor (211) is set such as to be satisfied when the vehicle (500) is within a tunnel; and in the third step (c), the control device (100) executes the inter-vehicle distance control in accordance with the output of the camera (221) upon determination that: the preceding objects (Vp) is detected based on the output of the camera (221) without being detected based on the output of the millimeter wave radar (211); and the environment of the camera (221) satisfies the second requirement.

B9. Other Embodiments 9

It is not essential to utilize all of the plurality of constituent elements of each form of the present disclosure described above, for solving a part or all of the above problems, or to achieve a part or all of the effects described in the present specification, and it would be possible to appropriately change or delete some of the plurality of constituent elements, replace them with new constituent elements, or delete a limited part of the contents. Furthermore in order to solve some or all of the above problems, or to achieve some or all of the effects described in the present specification, it would be possible to combine a part or all of the technical features included in one form of the above disclosure with a part or all of the technical features included in another form of the above disclosure, to constitute an independent form of the present disclosure.

What is claimed is:

1. A driving assist device comprising:

a first sensor;

a second sensor, the first and second sensors being used for detection of an object in front of the driving assist device; and a control device for executing inter-vehicle distance control using an output of the first sensor or an output of the second sensor to keep an inter-vehicle distance within a predetermined range, the inter-vehicle distance being a distance between a vehicle and at least one preceding object in front of the vehicle, wherein:

the control device is configured not to execute the inter-vehicle distance control under a predetermined first condition upon determination that:

the at least one preceding object is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device is configured to execute the inter-vehicle distance control under a predetermined second condition upon determination that the environment of the non-detection sensor satisfies a second requirement for determination of the reliability of the output of the non-detection sensor, each of the first and second conditions representing a corresponding level of the reliability of the output of the non-detection sensor, the level of the reliability of the output of the non-detection sensor represented by the second condition being lower than the level of the reliability of the output of the non-detection sensor represented by the first condition.

2. The driving assist device according to claim 1, wherein:

the control device is configured to perform at least one of a first process and a second process upon determination that a first case is present, the first case representing that the at least one preceding object is detected based on the output of one of the first sensor and the second sensor without being detected based on the output of the other of the first and second sensors;

the first process being configured to reduce an upper limit of an acceleration of the vehicle used by the inter-vehicle distance control for the first case to be lower than that for a second case;

the second case representing that the at least one preceding object is detected based on the output of each of the first and second sensors; and the second process being configured to reduce an upper limit of a speed of the vehicle used by the inter-vehicle distance control for the first case to be lower than that for the second case.

3. The driving assist device according to claim 2, wherein:

the control device is configured to individually set a parameter defining a motion of the vehicle in the inter-vehicle distance control for each of first to third detection cases;

the first detection case representing that the at least one preceding object is detected based on the output of the first sensor without being detected based on the output of the second sensor;

the second detection case representing that the at least one preceding object is detected based on the output of the second sensor without being detected based on the output of the first sensor; and the third detection case that is the second case representing that the at least one preceding object is detected based on the output of each of the first and second sensors.

4. The driving assist device according to claim 1, wherein:

the first sensor is a millimeter wave radar;

the second sensor is a camera; and the control device is configured to determine whether the environment of the non-detection sensor satisfies the second requirement in accordance with at least one of the output of the millimeter wave radar and the output of the camera upon determination that the at least one preceding object is detected based on the output of the camera without being detected based on the output of the millimeter wave radar.

5. The driving assist device according to claim 4, wherein:

the at least one preceding object includes a plurality of preceding objects;

the control device is configured to execute the inter-vehicle distance control that includes first to fourth processes upon determination that:

each of the plurality of preceding objects is detected based on the output of the camera without being detected based on the output of the millimeter wave radar; and the environment of the millimeter wave radar satisfies the second requirement;

the first process being to determine, in accordance with &nil a respective angular range occupied by each preceding object of the plurality of preceding objects in a horizontal direction, an azimuth angle of the corresponding preceding object with respect to a forward direction of the vehicle, and a width distance between the vehicle and the corresponding preceding object;

the second process being to calculate a deviation of each preceding object from the vehicle in a forward direction of the vehicle, based on the azimuth angle and on the width distance of the corresponding preceding object;

the third process being to use the output of the camera to determine a lower edge distance between the vehicle and each preceding object in accordance with a height from a lower edge of the corresponding preceding object to a vanishing point;

the fourth process being to adjust, upon determination that the deviations of one or more preceding objects in the plurality of preceding objects being lower than or equal to a predetermined threshold, the width distance between a shortest preceding object and the vehicle to be within the predetermined range; and the shortest preceding object having a shortest value of the deviation from the vehicle in the forward direction of the vehicle in the plurality of preceding objects.

6. The driving assist device according to claim 4, wherein:

the control device is configured to perform, in the inter-vehicle distance control, a first control task and a second control task;

the first control task being configured to set a relative speed between the vehicle and the at least one preceding object to zero, the relative speed being determined based on the output of the millimeter wave radar;

the second control task being configured to cause a value 1/TTC to converge to zero;

the value 1/TTC being calculated from a rate of magnification of an image of the at least one preceding object per unit of time, the rate of magnification of the image being determined based on the output of the camera; and the control device is configured to:

execute, in the inter-vehicle distance control, the first control task without executing the second control task upon determination that the at least one preceding object is detected based on the output of the millimeter wave radar; and execute, in the inter-vehicle distance control, the second control task without performing the first control task upon determination that the at least one preceding object is not detected based on the output of the millimeter wave radar.

7. The driving assist device according to claim 4, wherein the control device is configured to execute the inter-vehicle distance control that includes first and second setting processes upon determination that:

the at least one preceding object is detected based on the output of the camera without being detected based on the output of the millimeter wave radar; and the environment of the millimeter wave radar satisfies the second requirement;

the first setting process being to set a parameter to thereby cause a motion of the vehicle to be slower than the motion of the vehicle executed when the at least one preceding object is detected based on the output of the millimeter wave radar;

the second setting process being to set a value of a threshold parameter to be different from a value of the threshold parameter used by the inter-vehicle distance control in a case where the at least one preceding object is detected based on the output of the millimeter wave radar; and the threshold parameter being used to determine the at least one preceding object as a target, the inter-vehicle distance control keeping a distance from the vehicle to the target within the predetermined range.

8. The driving assist device according to claim 1, wherein:

the first sensor is a millimeter wave radar and the second sensor is a camera;

the control device is configured to execute the inter-vehicle distance control that includes a setting process upon determination that:

the at least one preceding object is detected based on the output of the camera without being detected based on the output of the millimeter wave radar;

the environment of the camera satisfies the second requirement; and the environment of the millimeter wave radar satisfies the second requirement; and the setting process being to set a parameter to thereby cause a motion of the vehicle to be slower than the motion of the vehicle executed when the at least one preceding object is detected based on the output of each of the millimeter wave radar and the camera.

9. The driving assist device according to claim 1, wherein:

the first sensor is a millimeter wave radar;

the second sensor is a camera;

the second requirement of the first sensor is set such as to be satisfied when the vehicle is within a tunnel; and the control device is configured to execute the inter-vehicle distance control in accordance with the output of the camera upon determination that:

the at least one preceding object is detected based on the output of the camera without being detected based on the output of the millimeter wave radar; and the environment of the camera satisfies the second requirement.

10. A driving assist method comprising:

(a) a first step in which a control device obtains an output of a first sensor for detecting an object in front of the control device;

(b) a second step in which the control device obtains an output of a second sensor, for detecting an object in front of the control device; and (c) a third step in which the control device executes inter-vehicle distance control using the output of the first sensor or the output of the second sensor to keep an inter-vehicle distance within a predetermined range, the inter-vehicle distance being a distance between a vehicle and at least one preceding object in front of the vehicle;

wherein:

the control device fails to execute the inter-vehicle distance control under a predetermined first condition upon determination that:

the at least one preceding object is detected based on the output of one of the first sensor and the second sensor without being detected based on the output of the other of the first and second sensors; and an environment of a non-detection sensor that is the other of the first and second sensors satisfies a first requirement for determination of a reliability of the output of the non-detection sensor; and the control device executes the inter-vehicle distance control under a predetermined second condition upon determination that the environment of the non-detection sensor satisfies a second requirement for determination of the reliability of the output of the non-detection sensor, each of the first and second conditions representing a corresponding level of the reliability of the output of the non-detection sensor, the level of the reliability of the output of the non-detection sensor represented by the second condition being lower than the level of the reliability of the output of the non-detection sensor represented by the first condition.

11. The driving assist method according to claim 10, wherein:

in the third step, the control device performs at least one of a first process and a second process upon determination that a first case is present, the first case representing that the at least one preceding object is detected based on the output of one of the first sensor and the second sensor without being detected based on the output of the other of the first and second sensors;

the first process is to reduce an upper limit of an acceleration of the vehicle used by the inter-vehicle distance control for the first case to be lower than that for a second case;

the second case represents that the at least one preceding object is detected based on the output of each of the first and second sensors; and the second process is to reduce an upper limit of a speed of the vehicle used by the inter-vehicle distance control for the first case to be lower than that for the second case.

12. The driving assist method according to claim 11, wherein:

in the third step:

the control device individually sets a parameter defining a motion of the vehicle in the inter-vehicle distance control for each of first to third detection cases;

the first detection case represents that the at least one preceding object is detected based on the output of the first sensor without being detected based on the output of the second sensor;

the second detection case represents that the at least one preceding object is detected based on the output of the second sensor without being detected based on the output of the first sensor; and the third detection case that is the second case representing that the at least one preceding object is detected based on the output of each of the first and second sensors.

13. The driving assist method according to claim 10, wherein:

the first sensor is a millimeter wave radar;

the second sensor is a camera; and in the third step, the control device determines whether the environment of the non-detection sensor satisfies the second requirement in accordance with at least one of the output of the millimeter wave radar and the output of the camera upon determination that the at least one preceding object is detected based on the output of the camera without being detected based on the output of the millimeter wave radar.

14. The driving assist method according to claim 13, wherein:

the at least one preceding object includes a plurality of preceding objects;

in the third step, the control device executes the inter-vehicle distance control that includes first to fourth processes upon determination that:

each of the plurality of preceding objects is detected based on the output of the camera without being detected based on the output of the millimeter wave radar; and the environment of the millimeter wave radar satisfies the second requirement;

the first process is to determine, in accordance with &nil a respective angular range occupied by each preceding object of the plurality of preceding objects in a horizontal direction, an azimuth angle of the corresponding preceding object with respect to a forward direction of the vehicle, and a width distance between the vehicle and the corresponding preceding object;

the second process is to calculate a deviation of each preceding object from the vehicle in a forward direction of the vehicle, based on the azimuth angle and on the width distance of the corresponding preceding object;

the third process is to use the output of the camera to determine a lower edge distance between the vehicle and each preceding object in accordance with a height from a lower edge of the corresponding preceding object to a vanishing point;

the fourth process is to adjust, upon determination that the deviations of one or more preceding objects in the plurality of preceding objects being lower than or equal to a predetermined threshold, the width distance between a shortest preceding object and the vehicle to be within the predetermined range; and the shortest preceding object having a shortest value of the deviation from the vehicle in the forward direction of the vehicle in the plurality of preceding objects.

15. The driving assist method according to claim 13, wherein:

the control device is to perform, in the inter-vehicle distance control, a first control task and a second control task;

the first control task is to set a relative speed between the vehicle and the at least one preceding object to zero, the relative speed being determined based on the output of the millimeter wave radar;

the second control task is to cause a value 1/TTC to converge to zero;

the value 1/TTC is calculated from a rate of magnification of an image of the at least one preceding object per unit of time, the rate of magnification of the image is determined based on the output of the camera; and in the third step:

the control device:

executes, in the inter-vehicle distance control, the first control task without executing the second control task upon determination that the at least one preceding object is detected based on the output of the millimeter wave radar; and executes, in the inter-vehicle distance control, the second control task without performing the first control task upon determination that the at least one preceding object is not detected based on the output of the millimeter wave radar.

16. The driving assist method according to claim 13, wherein:

in the third step, the control device executes the inter-vehicle distance control that includes first and second setting processes upon determination that:

the at least one preceding object is detected based on the output of the camera without being detected based on the output of the millimeter wave radar; and the environment of the millimeter wave radar satisfies the second requirement;

the first setting process is to set a parameter to thereby cause a motion of the vehicle to be slower than the motion of the vehicle executed when the at least one preceding object is detected based on the output of the millimeter wave radar;

the second setting process is to set a value of a threshold parameter to be different from a value of the threshold parameter used by the inter-vehicle distance control in a case where the at least one preceding object is detected based on the output of the millimeter wave radar; and the threshold parameter is used to determine the at least one preceding object as a target, the inter-vehicle distance control keeping a distance from the vehicle to the target within the predetermined range.

17. The driving assist method according to claim 10, wherein:

the first sensor is a millimeter wave radar and the second sensor is a camera;

in the third step, the control device executes the inter-vehicle distance control that includes a setting process upon determination that:

the at least one preceding object is detected based on the output of the camera without being detected based on the output of the millimeter wave radar;

the environment of the camera satisfies the second requirement; and the environment of the millimeter wave radar satisfies the second requirement; and the setting process is to set a parameter to thereby cause a motion of the vehicle to be slower than the motion of the vehicle executed when the at least one preceding object is detected based on the output of each of the millimeter wave radar and the camera.

18. The driving assist method according to claim 10, wherein:

the first sensor is a millimeter wave radar;

the second sensor is a camera;

the second requirement of the first sensor is set such as to be satisfied when the vehicle is within a tunnel; and in the third step, the control device executes the inter-vehicle distance control in accordance with the output of the camera upon determination that:

the at least one preceding object is detected based on the output of the camera without being detected based on the output of the millimeter wave radar; and the environment of the camera satisfies the second requirement.

* * * * *